(12) United States Patent
Walser

(10) Patent No.: US 8,025,008 B2
(45) Date of Patent: Sep. 27, 2011

(54) KEBAB MACHINE CARRIER

(75) Inventor: Robert D. Walser, Waxahachie, TX (US)

(73) Assignee: Automated Food Systems, Inc., Waxahachie, TX (US)

( * ) Notice: Subject to any disclaimer, the term of this patent is extended or adjusted under 35 U.S.C. 154(b) by 284 days.

(21) Appl. No.: 12/008,826

(22) Filed: Jan. 14, 2008

(65) Prior Publication Data

US 2009/0181155 A1 Jul. 16, 2009

(51) Int. Cl.
*A47J 37/04* (2006.01)
*B23B 3/00* (2006.01)
*B21C 3/00* (2006.01)

(52) U.S. Cl. ......... 99/419; 99/421 R; 99/427; 99/443 C; 425/126.2

(58) Field of Classification Search ........ 99/419–421 V, 99/443 C, 504, 495, 386, 400, 401, 444–450, 99/485, 358, 427; 198/604, 620, 626.1, 626.2; 227/100–103, 110–120; 426/665; 425/126.2
See application file for complete search history.

(56) References Cited

U.S. PATENT DOCUMENTS

| | | | |
|---|---|---|---|
| 2,142,390 A | 1/1939 | Zerr | |
| 2,815,530 A * | 12/1957 | Alexander | 99/419 |
| 3,221,673 A * | 12/1965 | Shelly | 425/126.2 |
| 3,234,585 A | 2/1966 | Snyder | |
| 3,405,422 A * | 10/1968 | Sico et al. | 99/419 |
| 3,452,855 A | 7/1969 | Posen et al. | |
| 3,550,188 A * | 12/1970 | Howard, Jr. et al. | 99/419 |
| 3,579,713 A | 5/1971 | Kang et al. | |
| 3,729,774 A | 5/1973 | Chow | |
| 3,809,053 A | 5/1974 | Navarro | |
| 3,835,761 A | 9/1974 | Yamanaka | |
| 4,069,960 A | 1/1978 | Lowrance | |
| 4,130,936 A | 12/1978 | Cottrell | |
| 4,138,050 A | 2/1979 | McKinney et al. | |
| 4,180,198 A | 12/1979 | Lowrance | |
| 4,232,811 A | 11/1980 | Cottrell et al. | |
| 4,352,242 A | 10/1982 | Plet | |
| 4,379,795 A | 4/1983 | Walser | |
| 4,604,771 A * | 8/1986 | Dolle | 426/421 |
| 4,729,501 A * | 3/1988 | Lowrance | 227/117 |
| 4,842,181 A | 6/1989 | Walser | |
| 5,069,292 A | 12/1991 | Baker et al. | |
| 5,109,757 A * | 5/1992 | Dolle | 99/419 |
| 5,127,319 A * | 7/1992 | Dolle | 99/419 |
| 5,174,195 A * | 12/1992 | Anderson | 99/419 |
| 5,429,226 A | 7/1995 | Ensch et al. | |
| 5,516,540 A | 5/1996 | Cathenaut | |

(Continued)

FOREIGN PATENT DOCUMENTS

DE 101 24 119 11/2002

*Primary Examiner* — Reginald L Alexander
(74) *Attorney, Agent, or Firm* — Law Office of William Gustavson, PC

(57) ABSTRACT

A kebab machine (10) is disclosed for inserting sticks (12) into various food components (14*a-f*), such as meat, vegetables and the like, automatically. The food components are held within carriers (500, 600) while the individual sticks are conveyed by a stick conveyor (22). The sticks are driven through the carriers (500, 600) and food components therein to form the kebab. As the carriers (500, 600) pass over a sprocket (66), adjacent carrier elements (502, 602) tilt relative each other with finger like extensions (504, 506, 604, 606) tilting up to release and eject the kebabs from the carriers for further processing.

19 Claims, 40 Drawing Sheets

U.S. PATENT DOCUMENTS

| | | |
|---|---|---|
| 5,650,085 A | 7/1997 | Chen |
| 5,699,651 A | 12/1997 | Miller et al. |
| 5,740,722 A | 4/1998 | Emsens |
| 5,783,239 A | 7/1998 | Callens et al. |
| 5,843,500 A | 12/1998 | Guarino |
| 5,876,764 A | 3/1999 | Buttin et al. |
| 6,161,471 A | 12/2000 | Emsens |
| 6,505,731 B2 | 1/2003 | Lambertz |

* cited by examiner

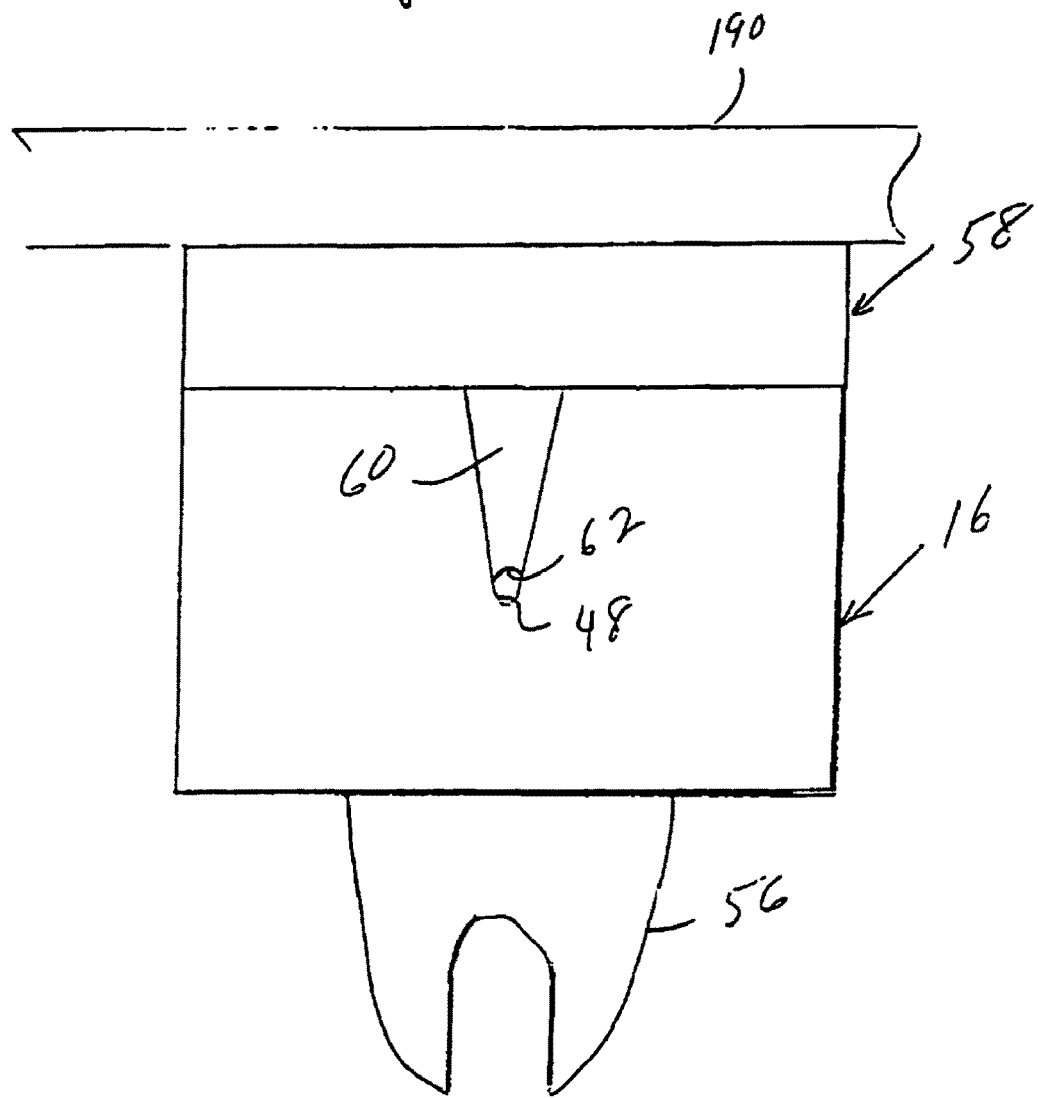

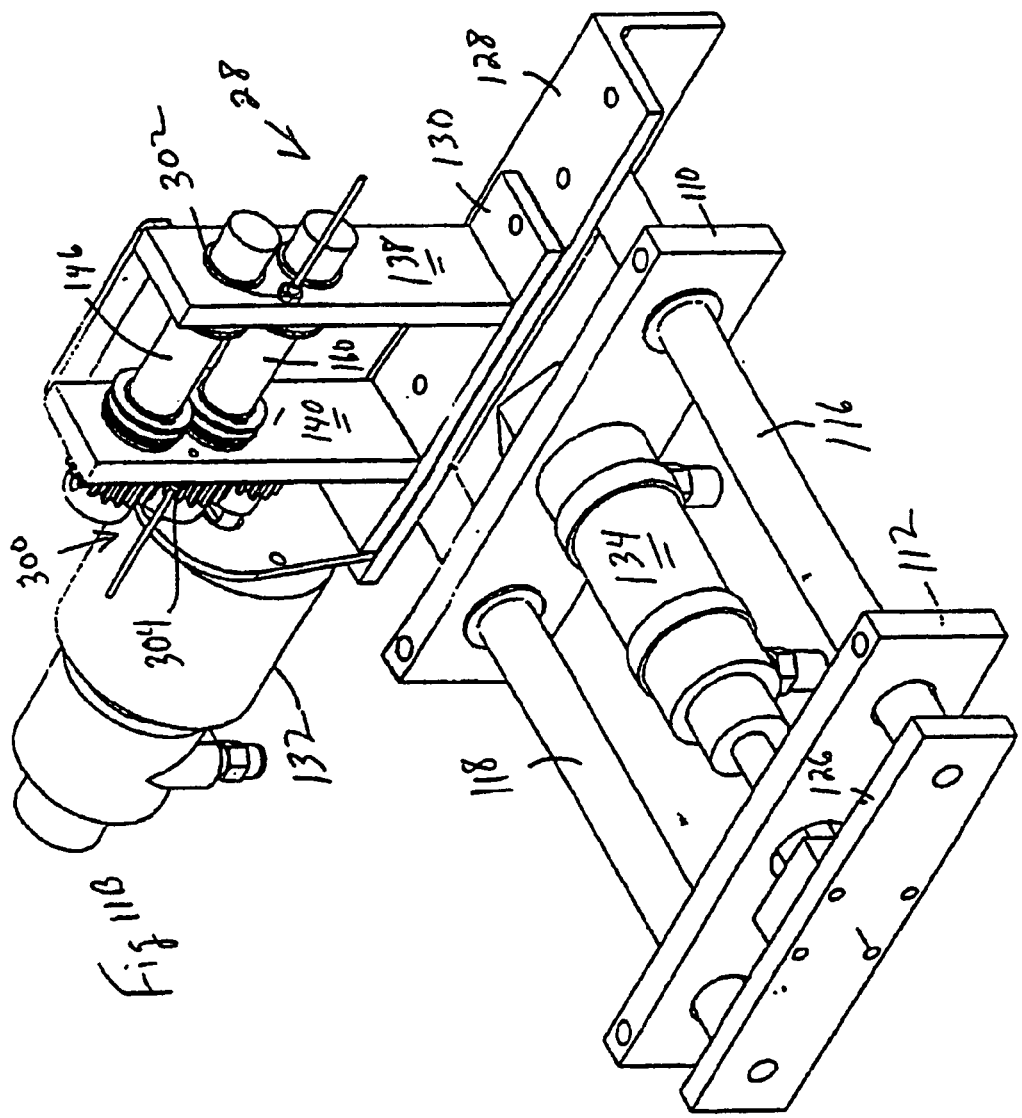

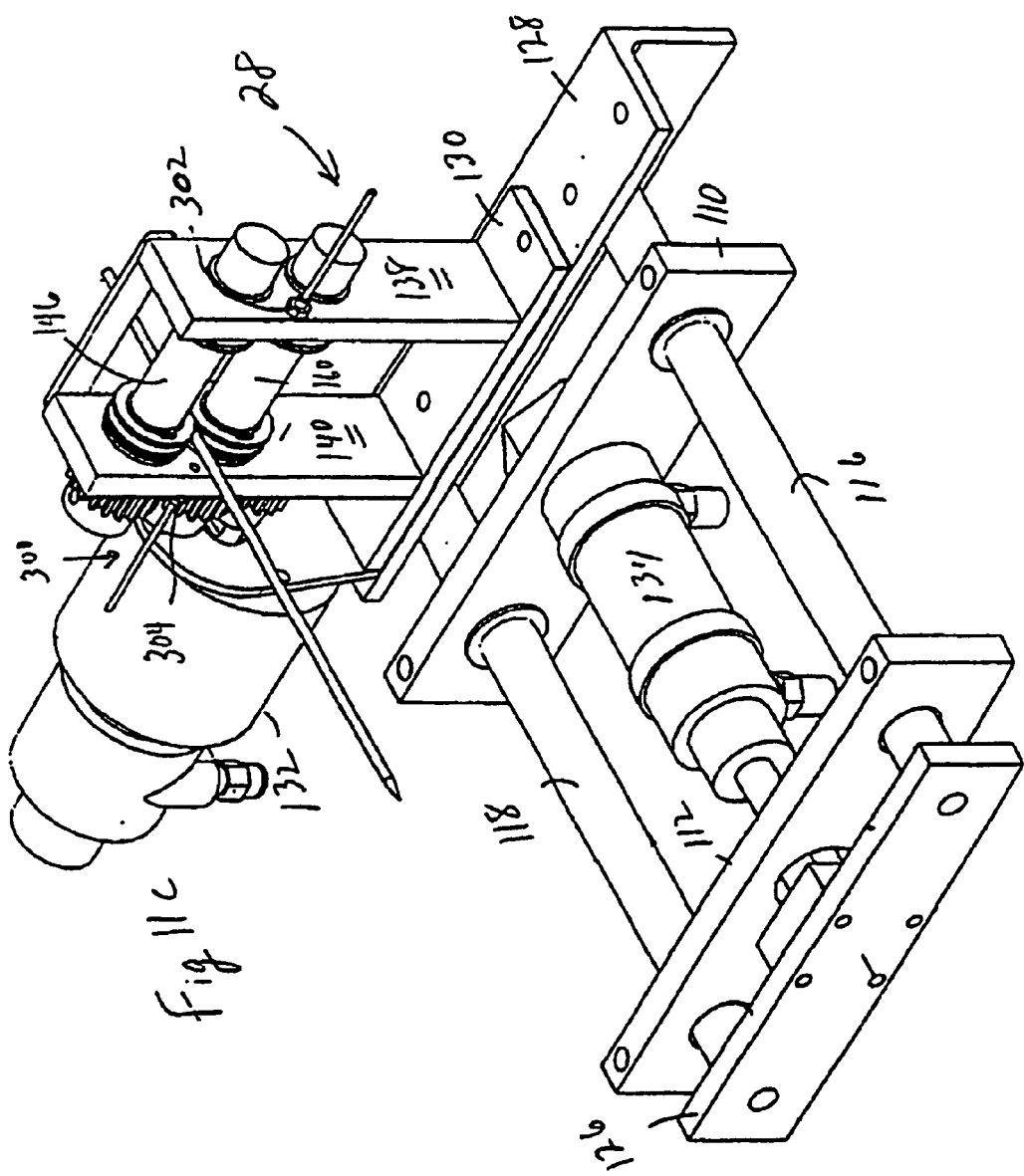

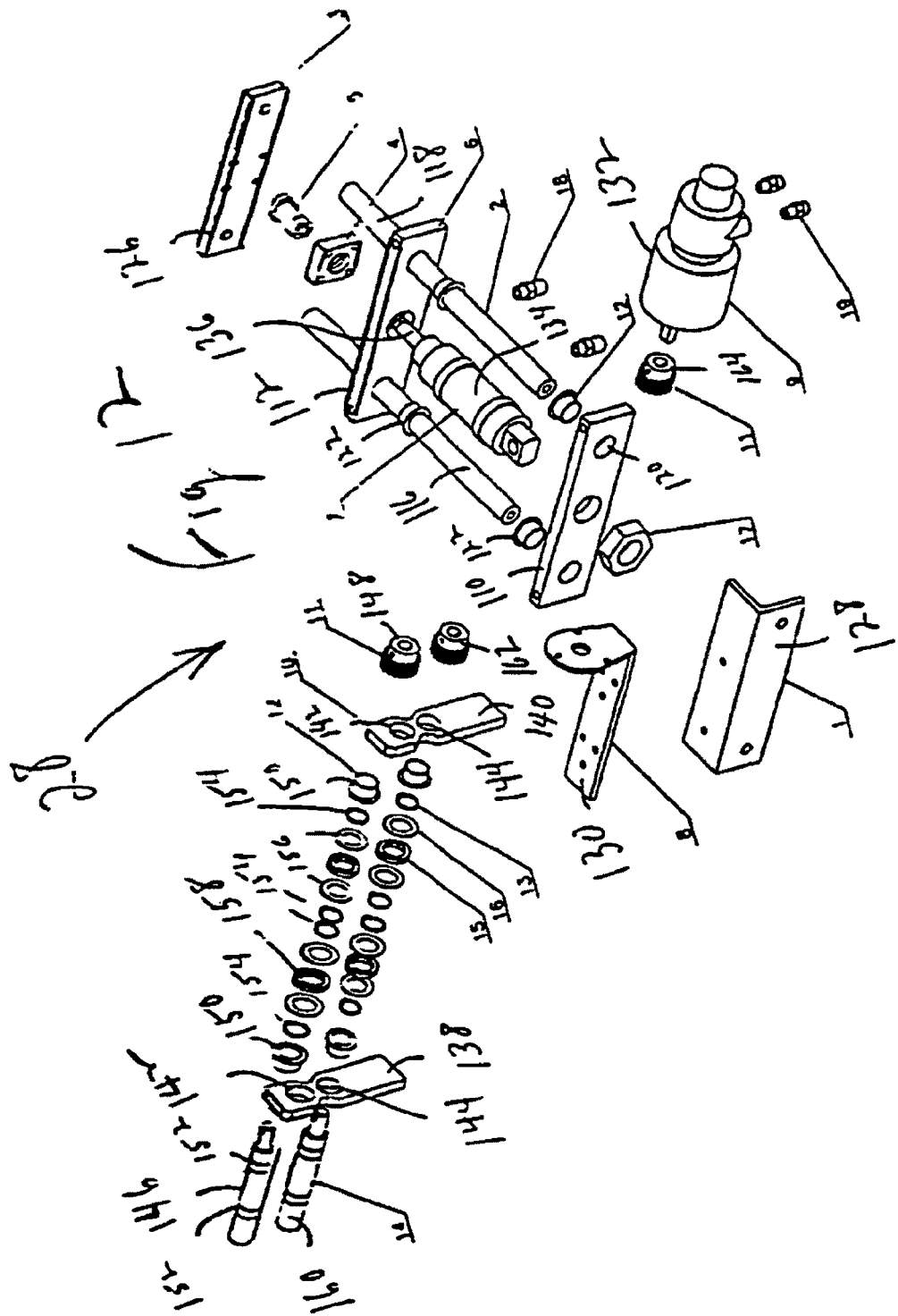

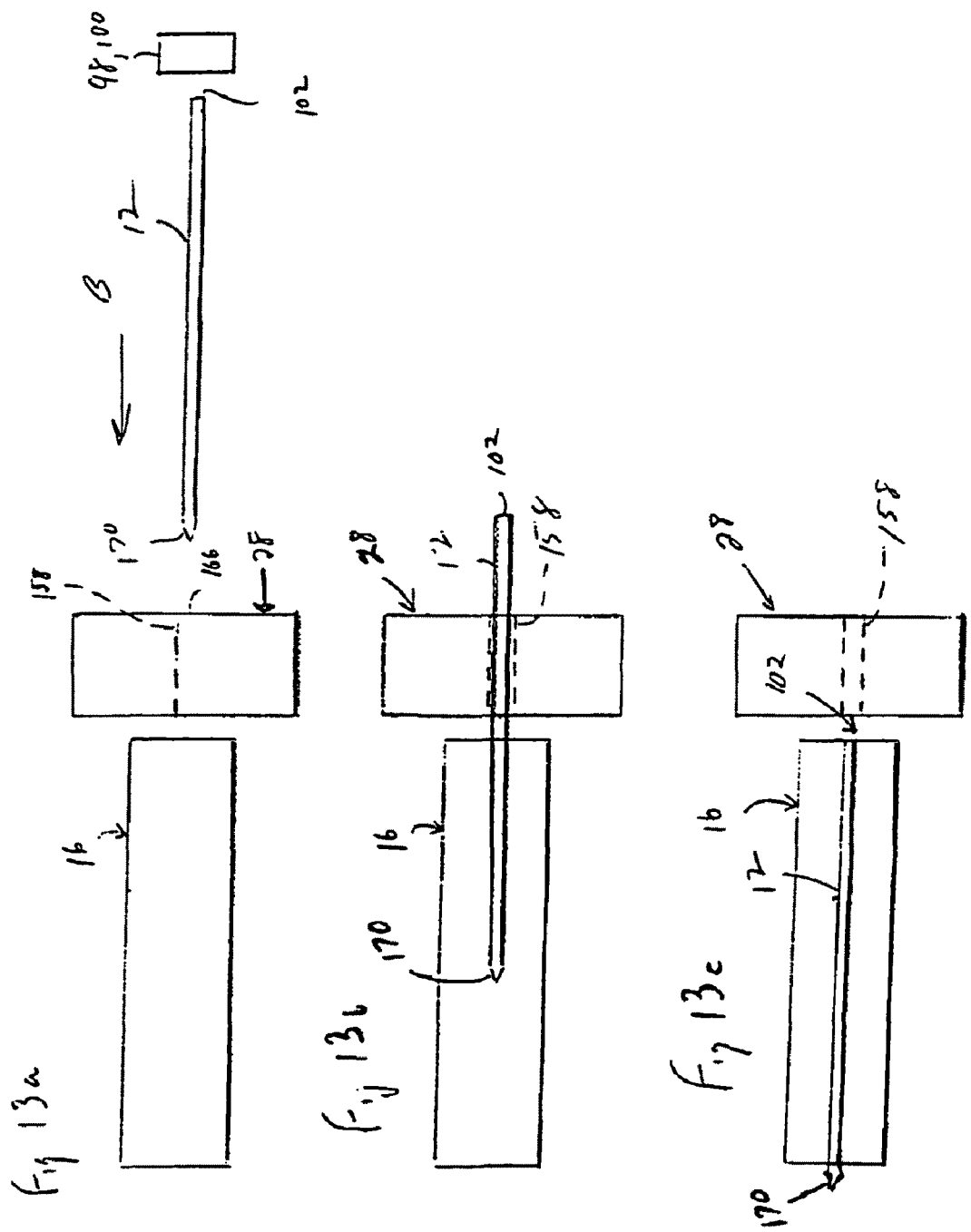

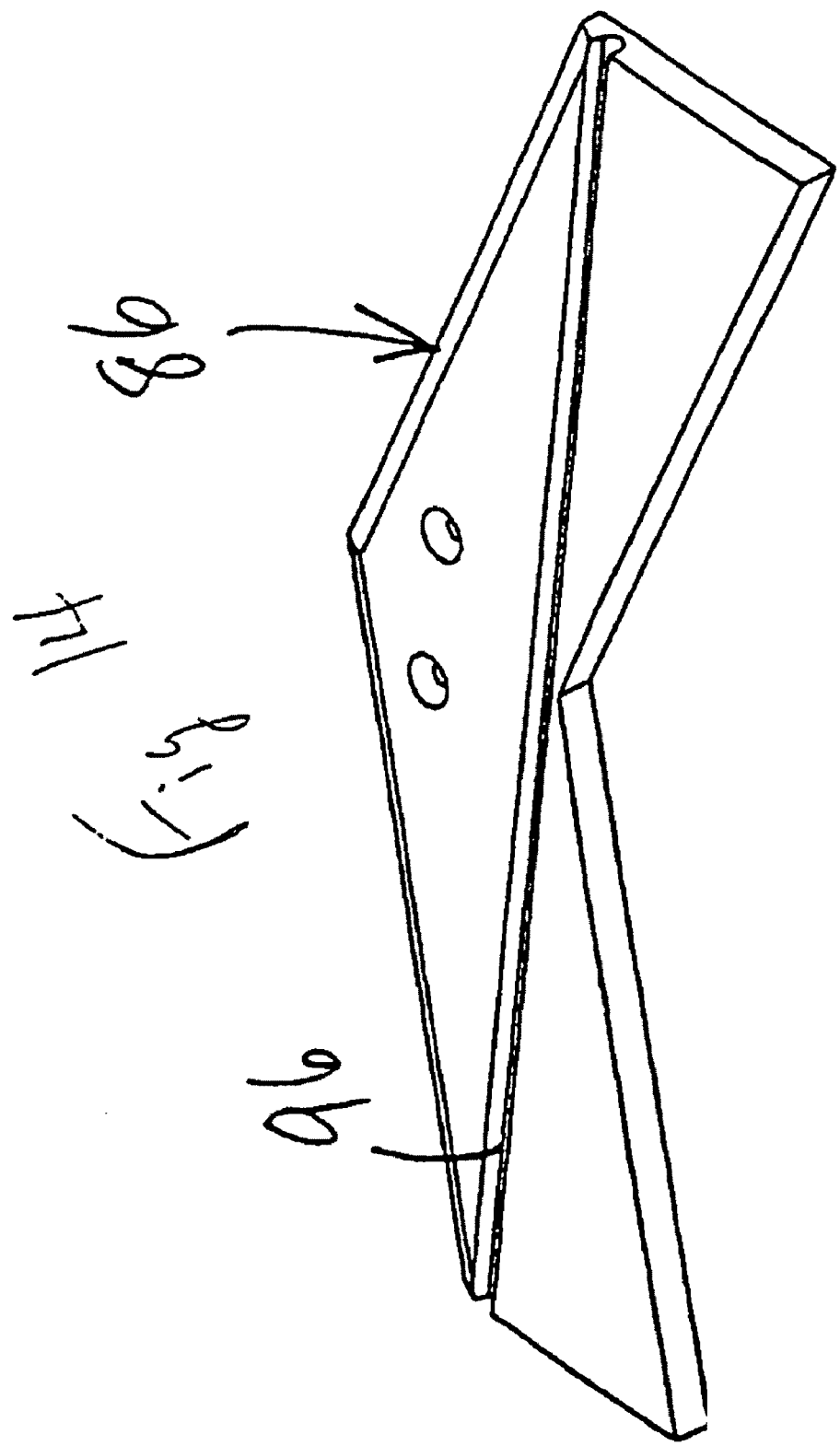

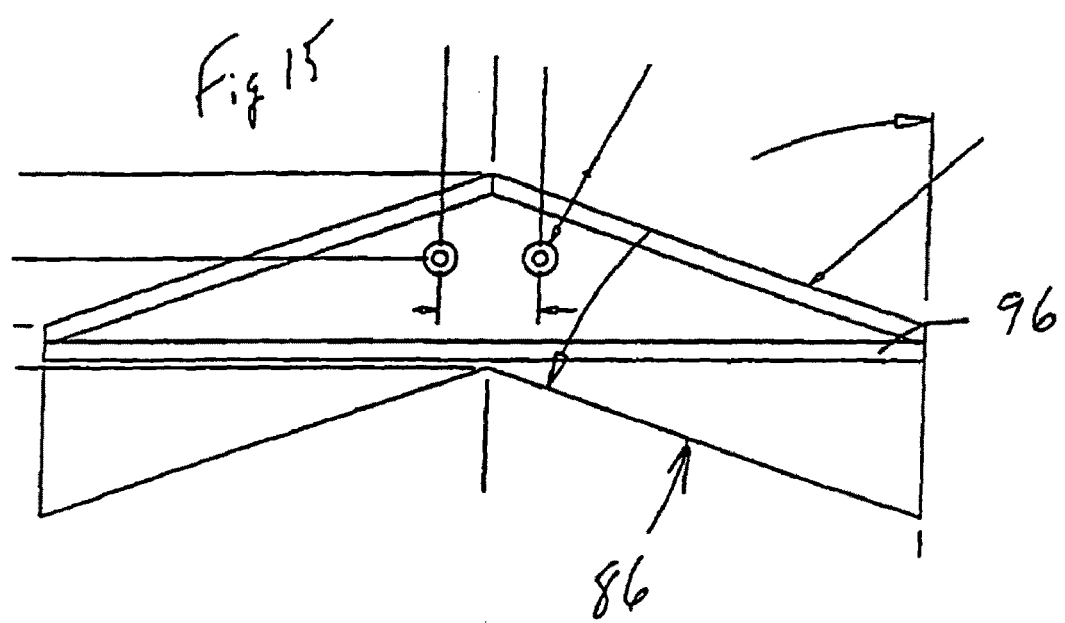

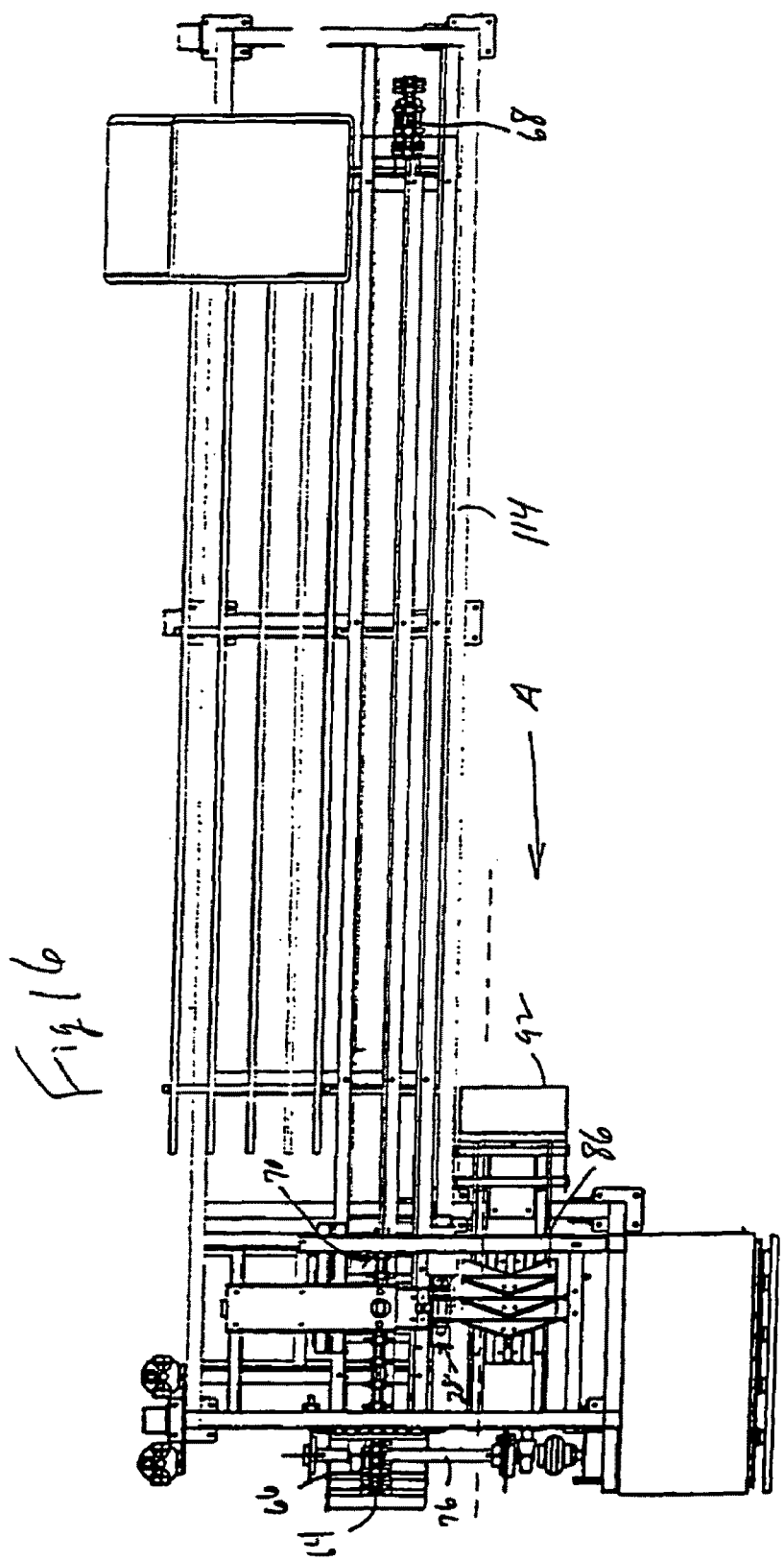

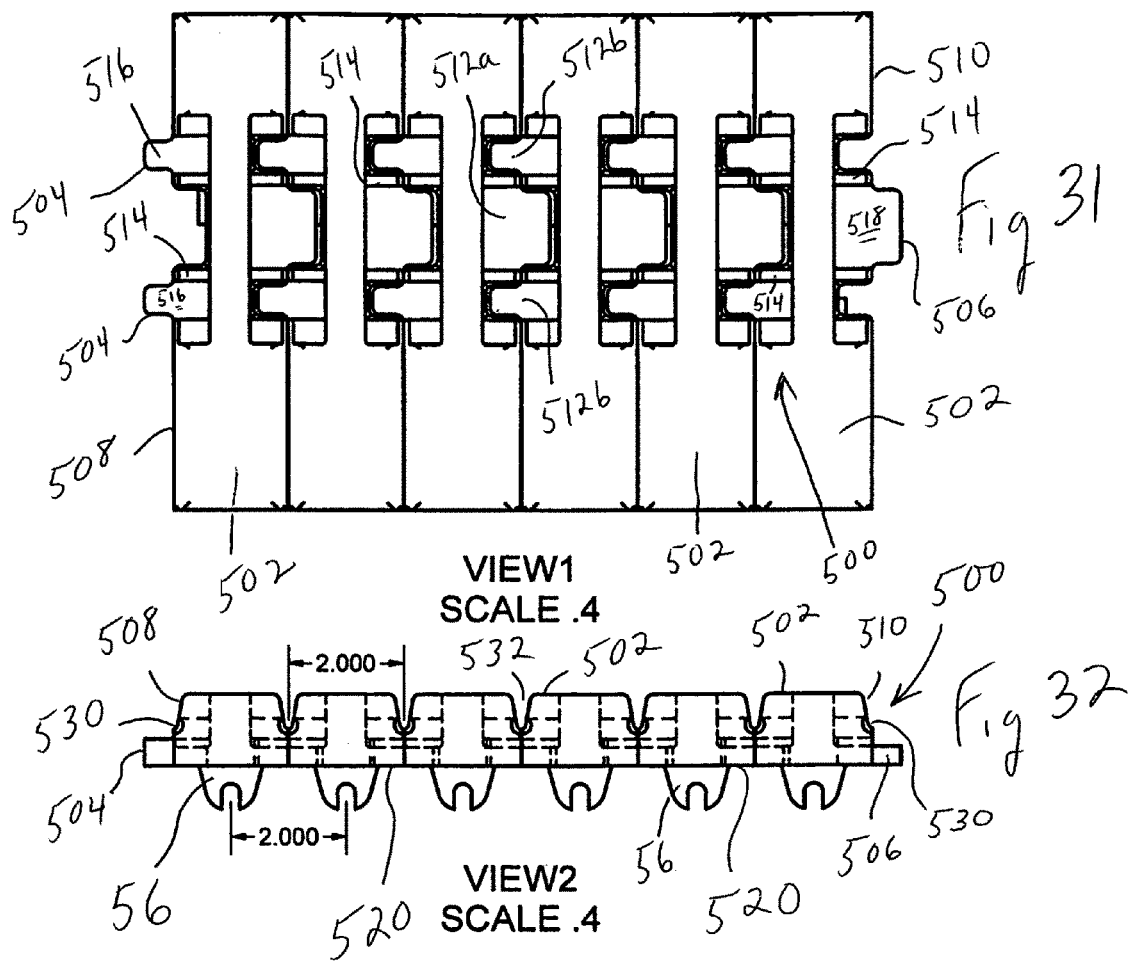

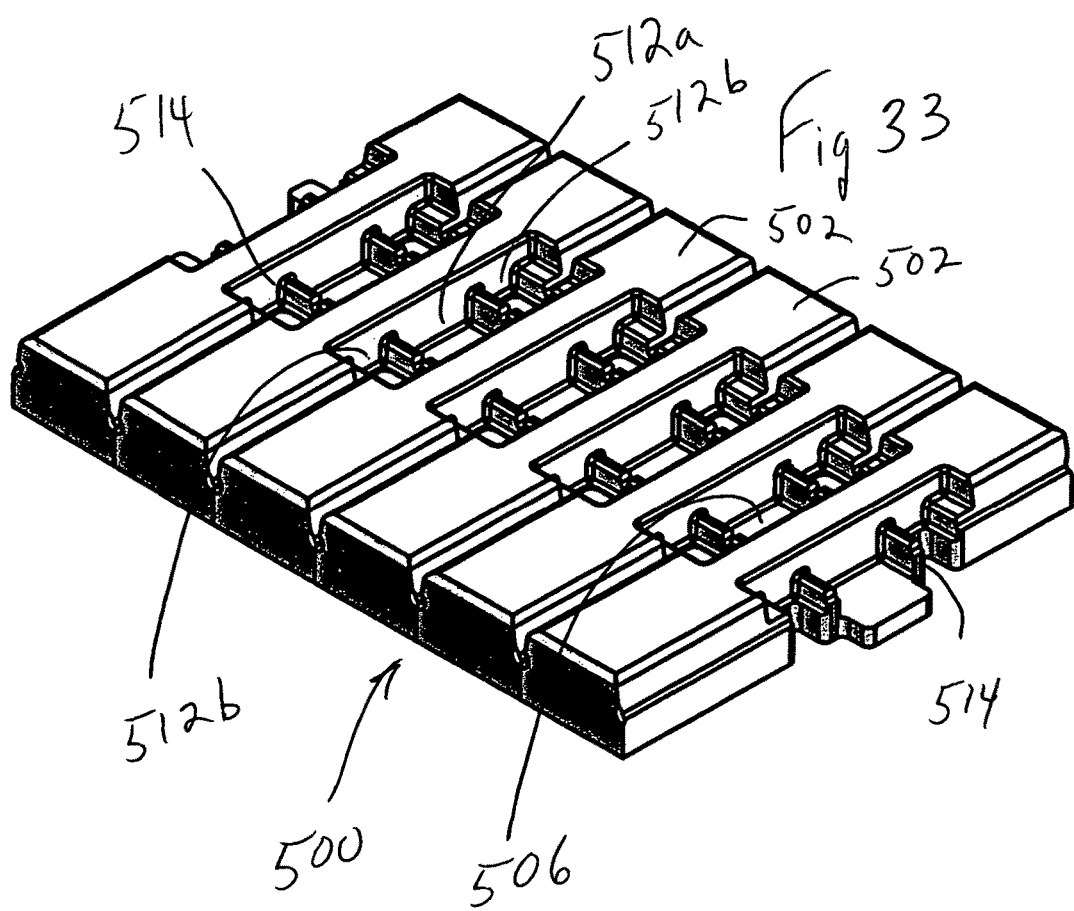

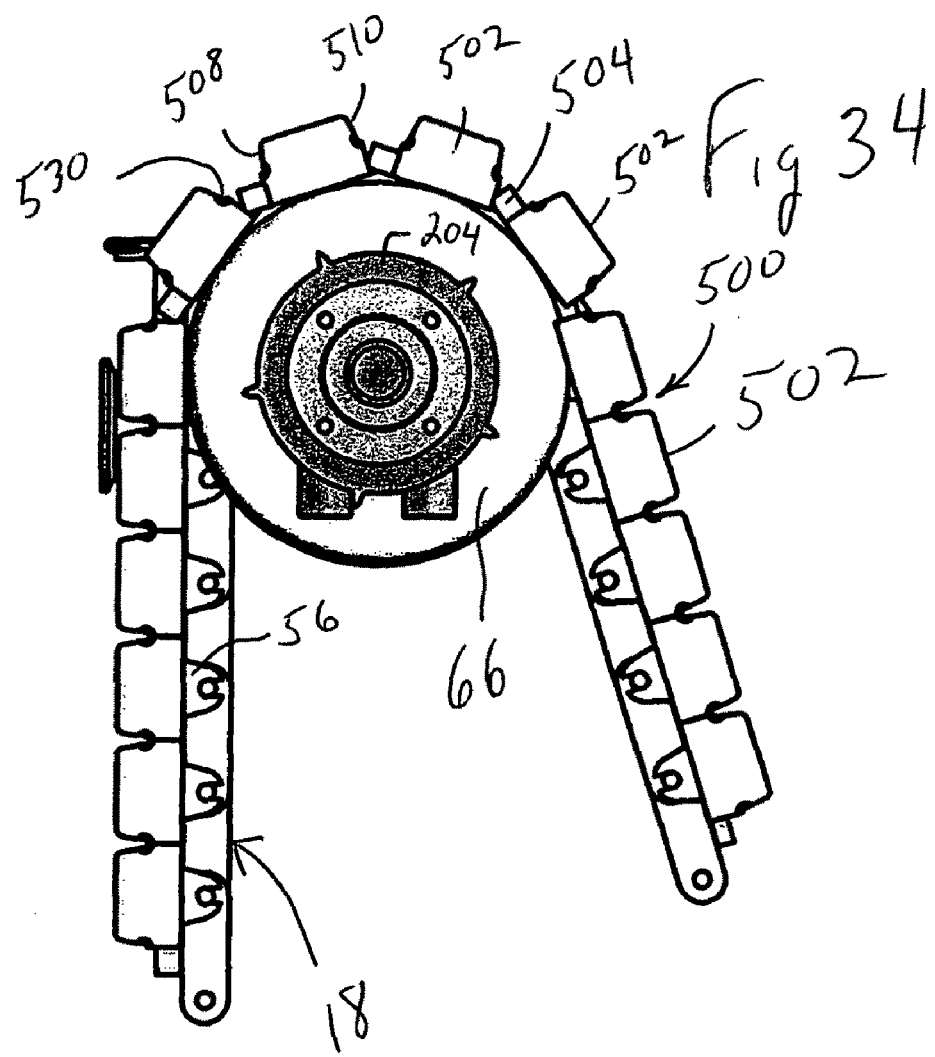

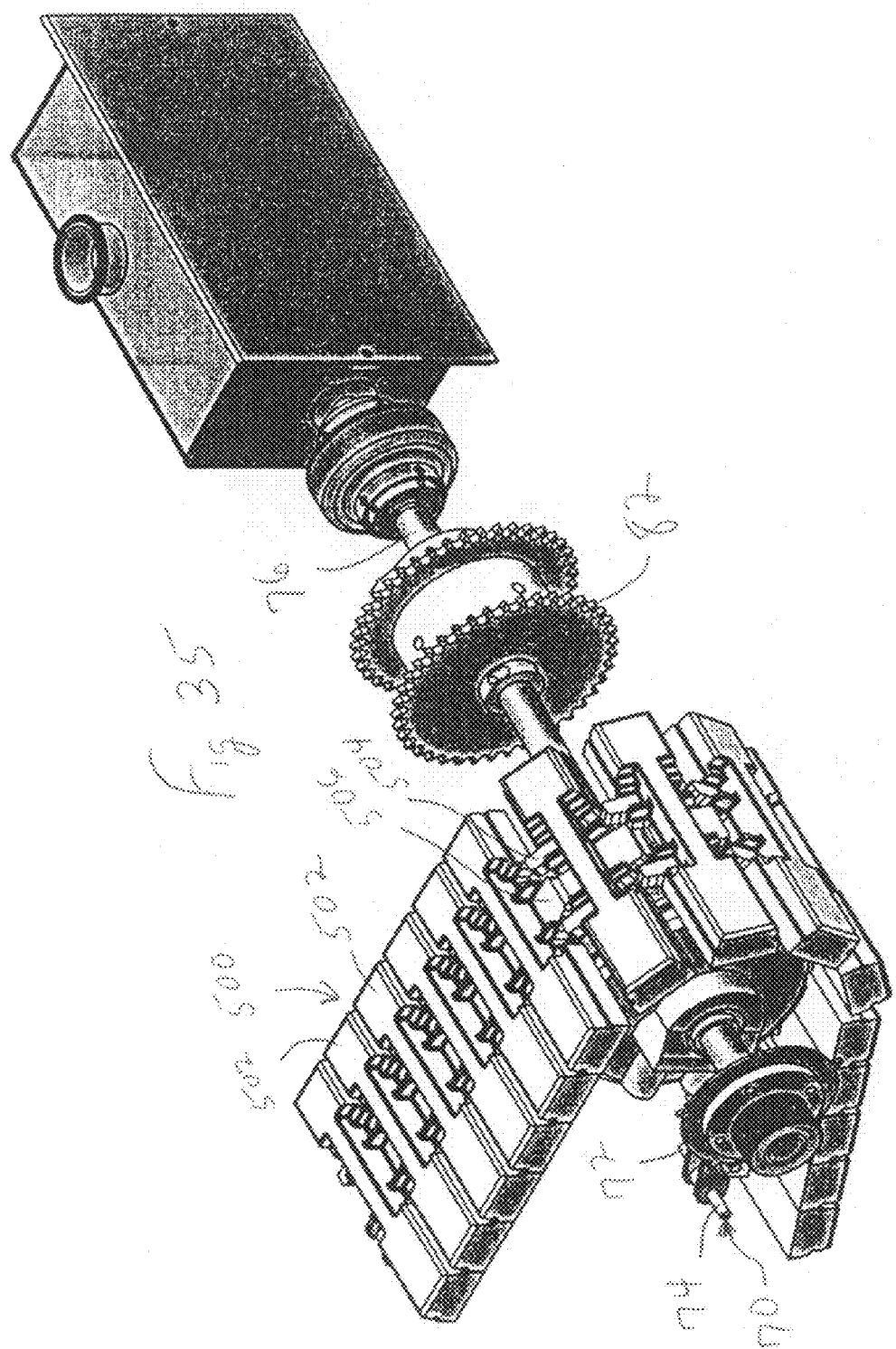

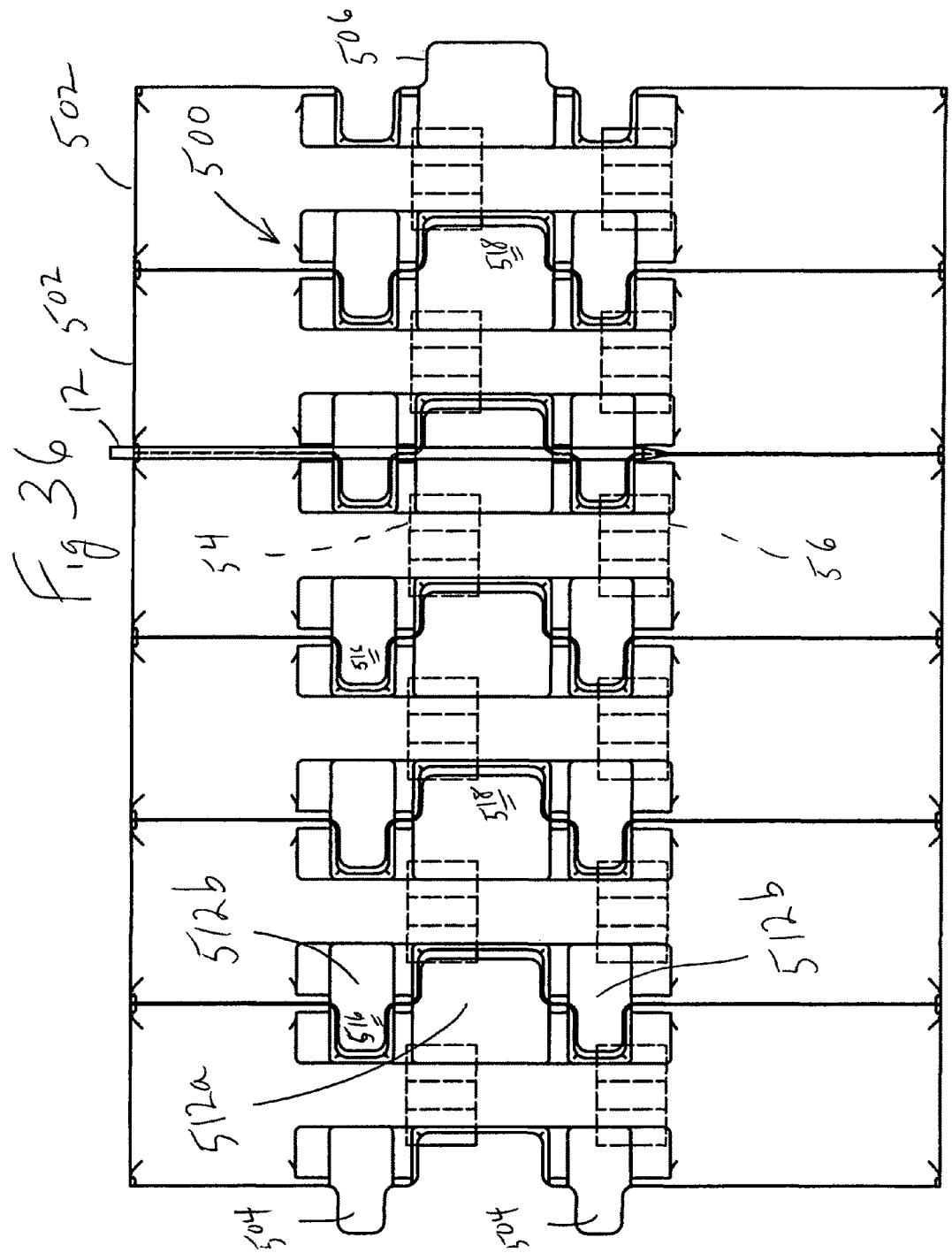

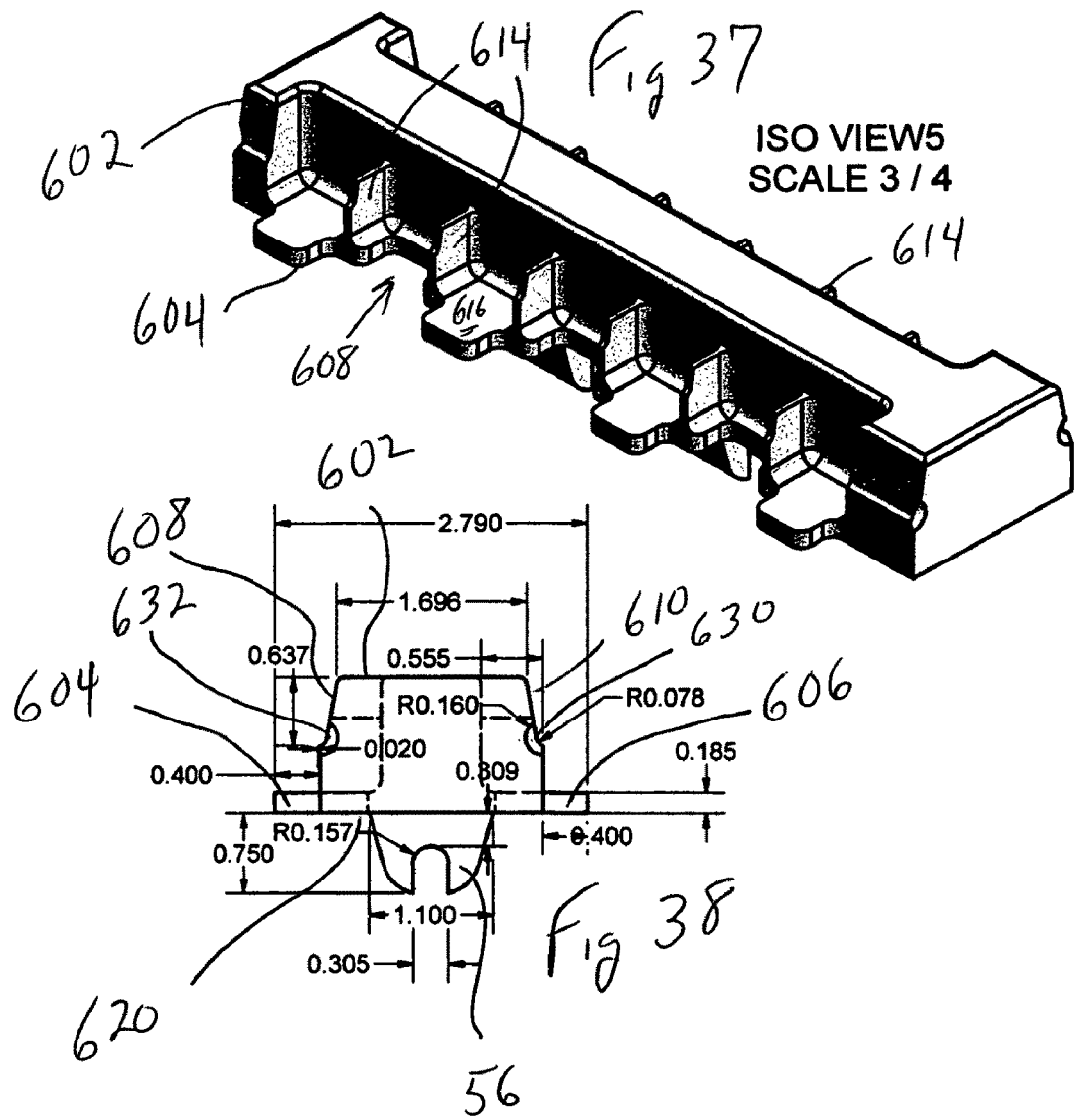

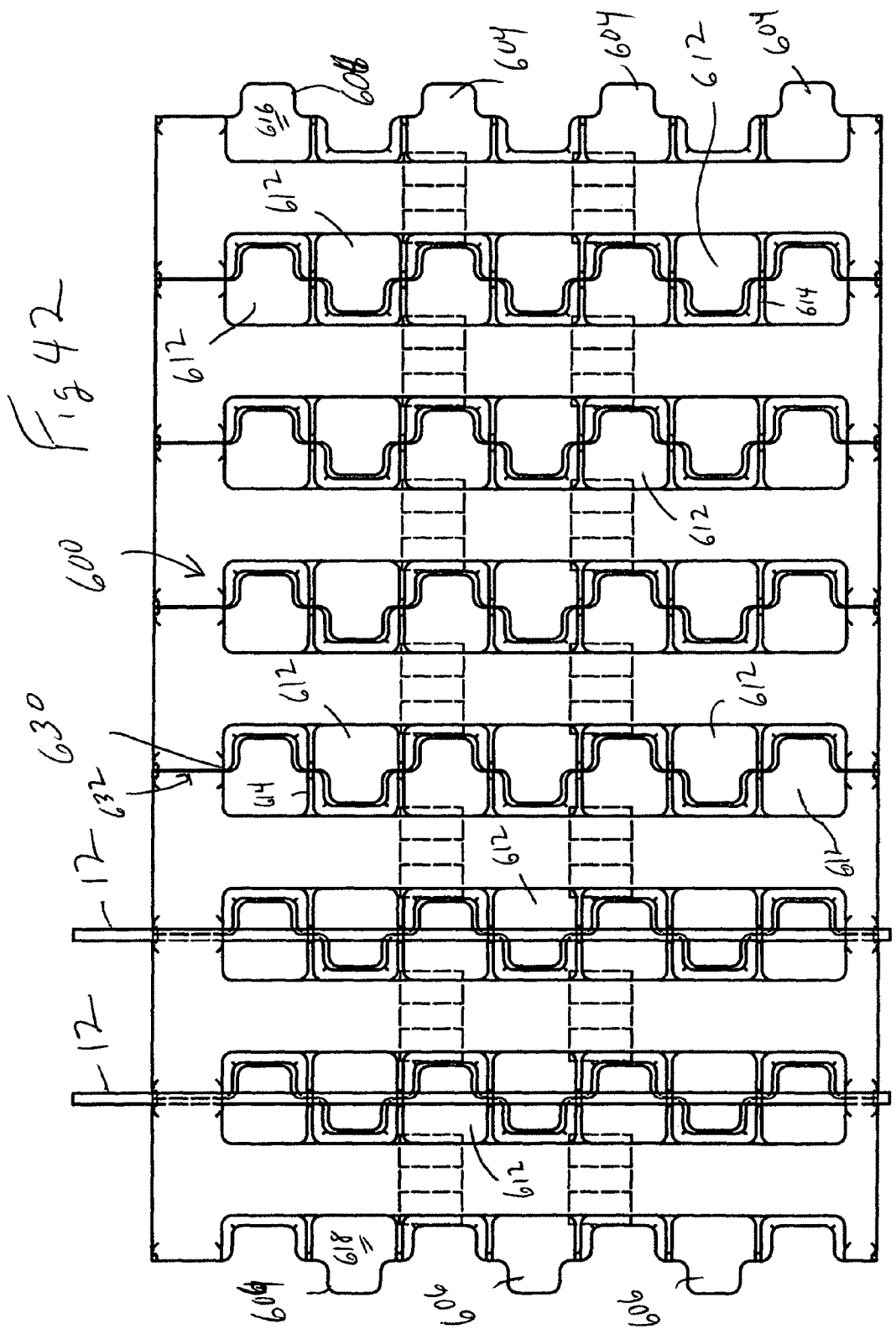

KEBAB MACHINE CARRIER

TECHNICAL FIELD OF THE INVENTION

This invention relates to a food producing machine, and particularly to a machine to create a kebab and carriers therefore.

BACKGROUND OF THE INVENTION

A kebab is generally understood to be a series of food items skewered on a stick which is then typically cooked over a stove or barbecue. The typical kebab includes meat, such as beef and chicken, vegetables such as onions, peppers and the like, and any other food items desired.

A significant and growing market is the production of kebabs within a mass production setting. The kebabs are then refrigerated or frozen and distributed to stores for sale to customers. Customers find these items to be very desirable as the customer need not purchase the particular food items, cut them to the desired shape and skewer them on a stick, but need only take the kebab from its appropriate packaging and begin the cooking processing. A need exists for an efficient and effective apparatus and method for producing these kebabs in a mass production environment.

SUMMARY OF THE INVENTION

In accordance with one aspect of the present invention, an apparatus is provided for preparing a food item. The apparatus includes a carrier which holds at least one food component spaced along a first direction. A carrier conveyor assembly conveys the carrier from an initial position to a predetermined position. An insertion device drives a stick in the first direction through the food component to create the food item when the carrier is in the predetermined position.

In accordance with another aspect of the present invention, a positioning device can be provided to position the stick at the insertion device for driving through the food component. A stick conveyor can be used to carry the stick from a storage position to a position proximate the positioning device. The positioning device can include an air jet to drive the stick into the insertion device. A pair of insertion drives can be utilized side by side to insert a pair of sticks into a pair of side by side carriers.

In accordance with another aspect of the present invention, as the carriers pass over a sprocket, adjacent carrier elements tilt relative each other with finger like extensions tilting up to release and eject the kebabs from the carriers for further processing.

BRIEF DESCRIPTION OF THE DRAWINGS

For a more complete understanding of the present invention and the advantages thereof, reference is now made to the following description taken in conjunction with the accompanying drawings, in which:

FIG. 10 is an end view of the carrier with the top thereon;

FIG. 11B is a perspective view of the stick driving device of the first embodiment illustrating the fiber optic sensor;

FIG. 11C is a perspective view of the stick driving device of the first embodiment illustrating the fiber optic sensor with a stick breaking the beam path;

FIG. 12 is an exploded view of the stick driving device of FIG. 11;

FIGS. 13a, 13b and 13c illustrate the process of driving the stick into the food components;

FIG. 14 is a perspective view of a flight of the stick conveyor;

FIG. 15 is a plan view of the flight;

FIG. 16 is a plan view of the first embodiment;

FIG. 31 is a plan view of a third modified carrier;

FIG. 32 is a side view of the carrier of FIG. 31;

FIG. 33 is a perspective view of the carrier of FIG. 31;

FIG. 34 is a detail view of the chain drive and carrier of FIG. 31;

FIG. 35 is a perspective view of the chain drive and carrier of FIG. 31;

FIG. 36 is a plan view of the carrier of FIG. 31 with sticks;

FIG. 37 is a perspective view of a variation of the carrier element of FIG. 31;

FIG. 38 is an end view of the carrier element of FIG. 37;

FIG. 42 is a plan view of the carrier elements of FIG. 37 in use.

DETAILED DESCRIPTION OF THE INVENTION

Figure 1:
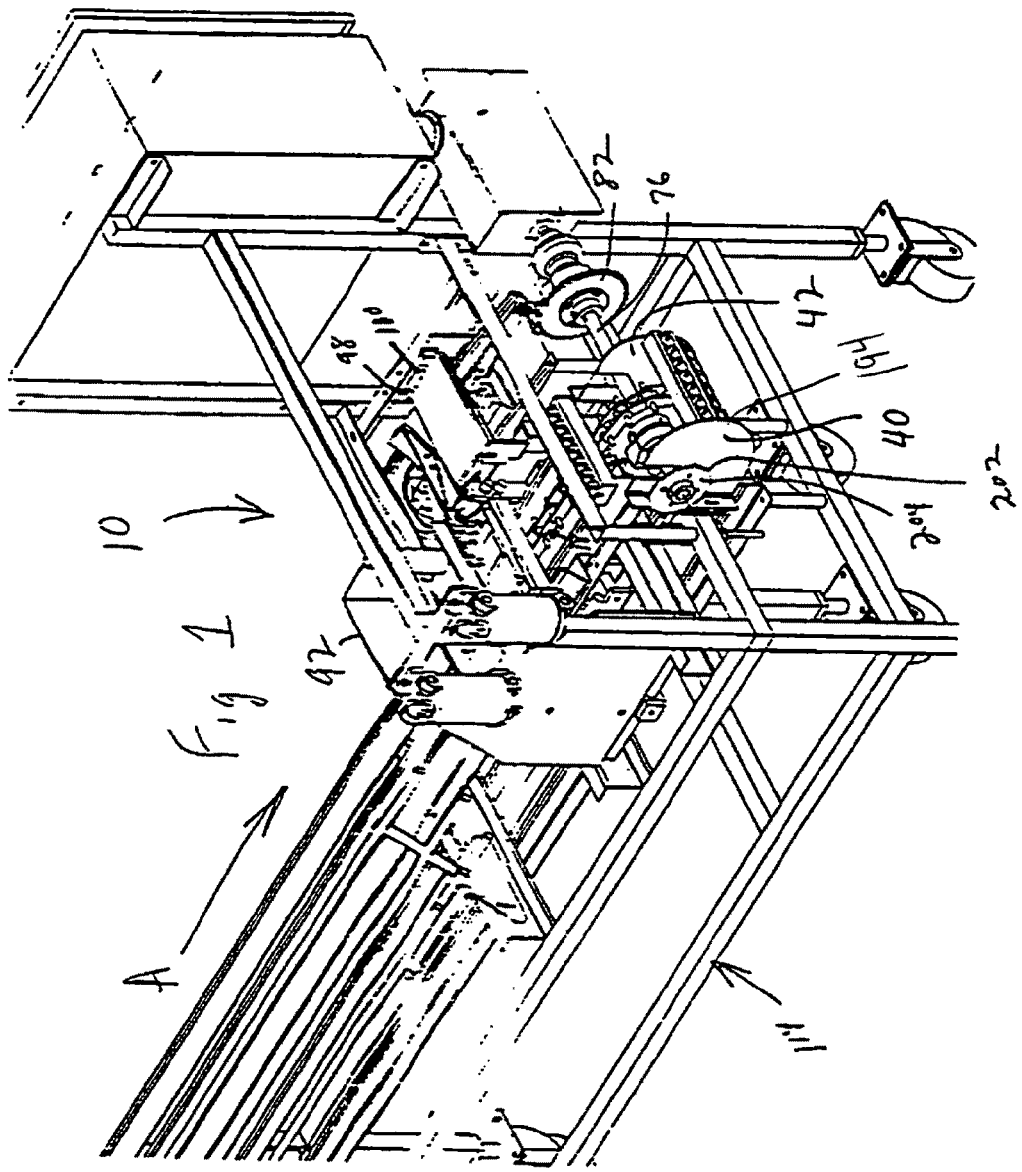
FIG. 1 is a front perspective view of a portion of a first embodiment of the present invention.

With reference now to the figures, a kebab machine 10 will be described. The kebab machine will, as described hereinafter, insert a stick 12 into various food components 14a-g held in a carrier 16 to form a kebab. The food components can be precooked, or raw, as desired. Further, stick 12 should be interpreted to include a common wooden kebab stick, a rod, a spear or any other similar linear skewering device.

With reference to FIGS. 1-3 and 13, the basic operation of the kebab machine 10 moves a side by side pair of carriers 16 carried along a carrier conveyor chain 18 in direction A to a predetermined position 20 while a stick conveyor 22 simultaneously positions a pair of sticks 12 side by side in direction A proximate the predetermined position. An adjacent pair of air jets 98 and 100 each discharge a blast of air, impacting the ends 102 of the sticks 12 and driving them in direction B into an insertion device 28 which has a spaced pair of mating drive rollers 158 which catch the sticks and drive the sticks further in direction B into the food components 14a-g in the adjacent carrier 16. The insertion device 28 is mounted for limited motion in the direction of insertion B to facilitate release of the sticks after they have been inserted in the food components and to prevent interference of movement of the carriers with the sticks inserted therethrough from the predetermined position 20. The skewered food items are removed from their associated carrier as the carrier conveyor chain 18 continues its motion by engagement of the ends of the stick by a pair of cam plates 40 and 42 which discharge the kebab from the carrier 16.

Having described the general operation of the machine 10, specific details will now be described.

Figure 4:
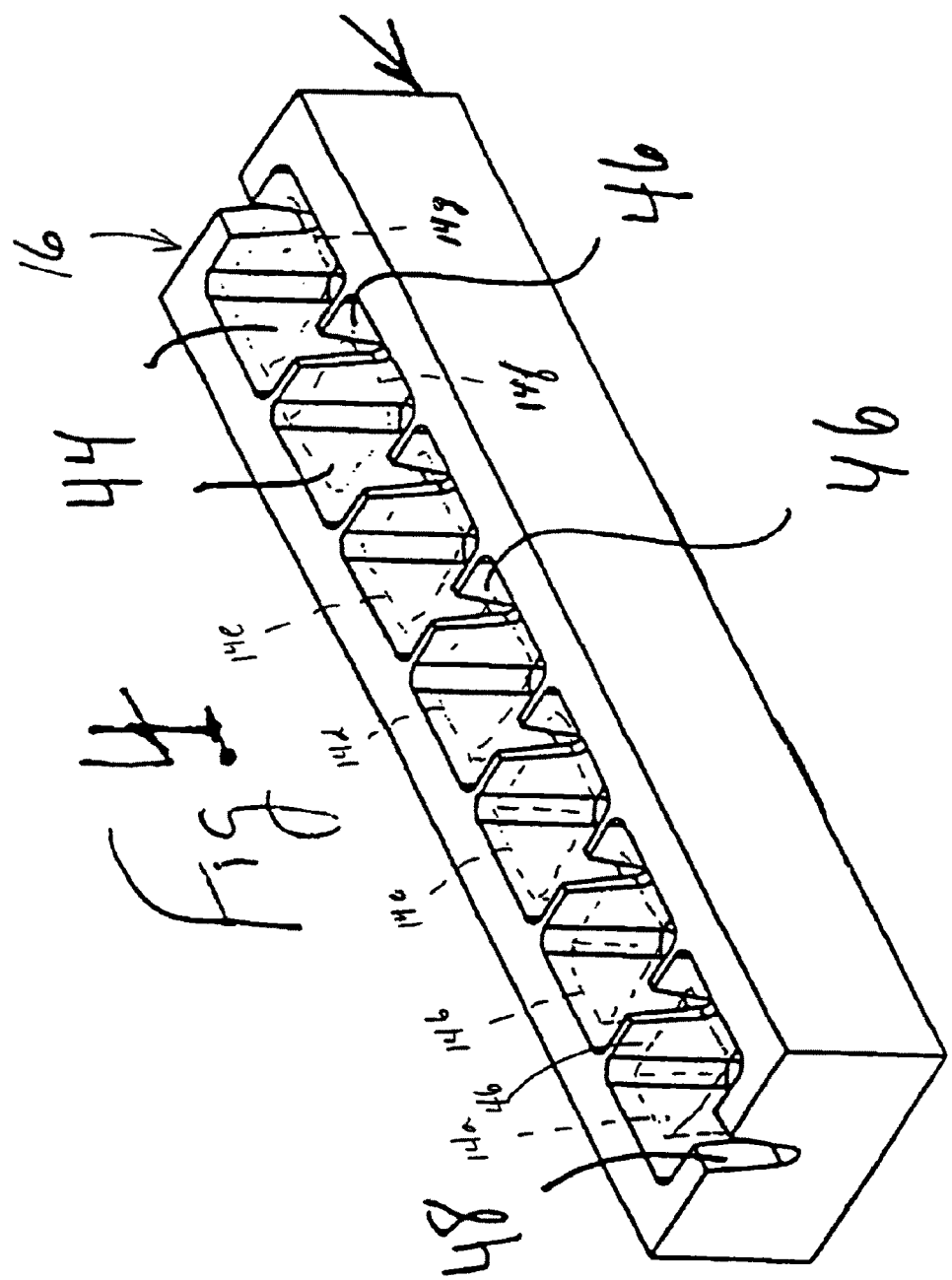
FIG. 4 is a perspective view of a carrier utilized in the first embodiment.
Figure 5:
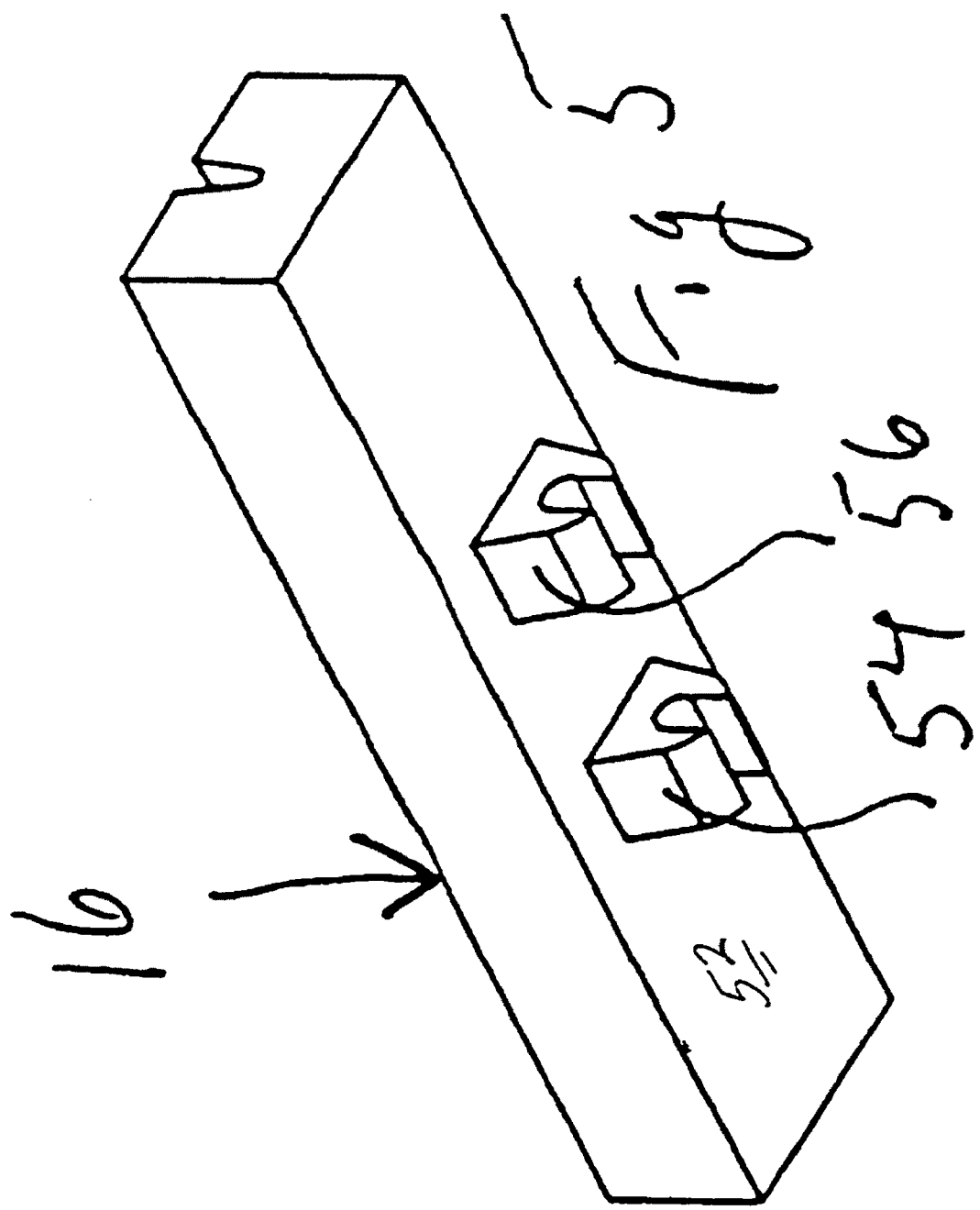
FIG. 5 is a perspective view of the carrier of FIG. 4 from beneath the carrier portion.
Figure 6:
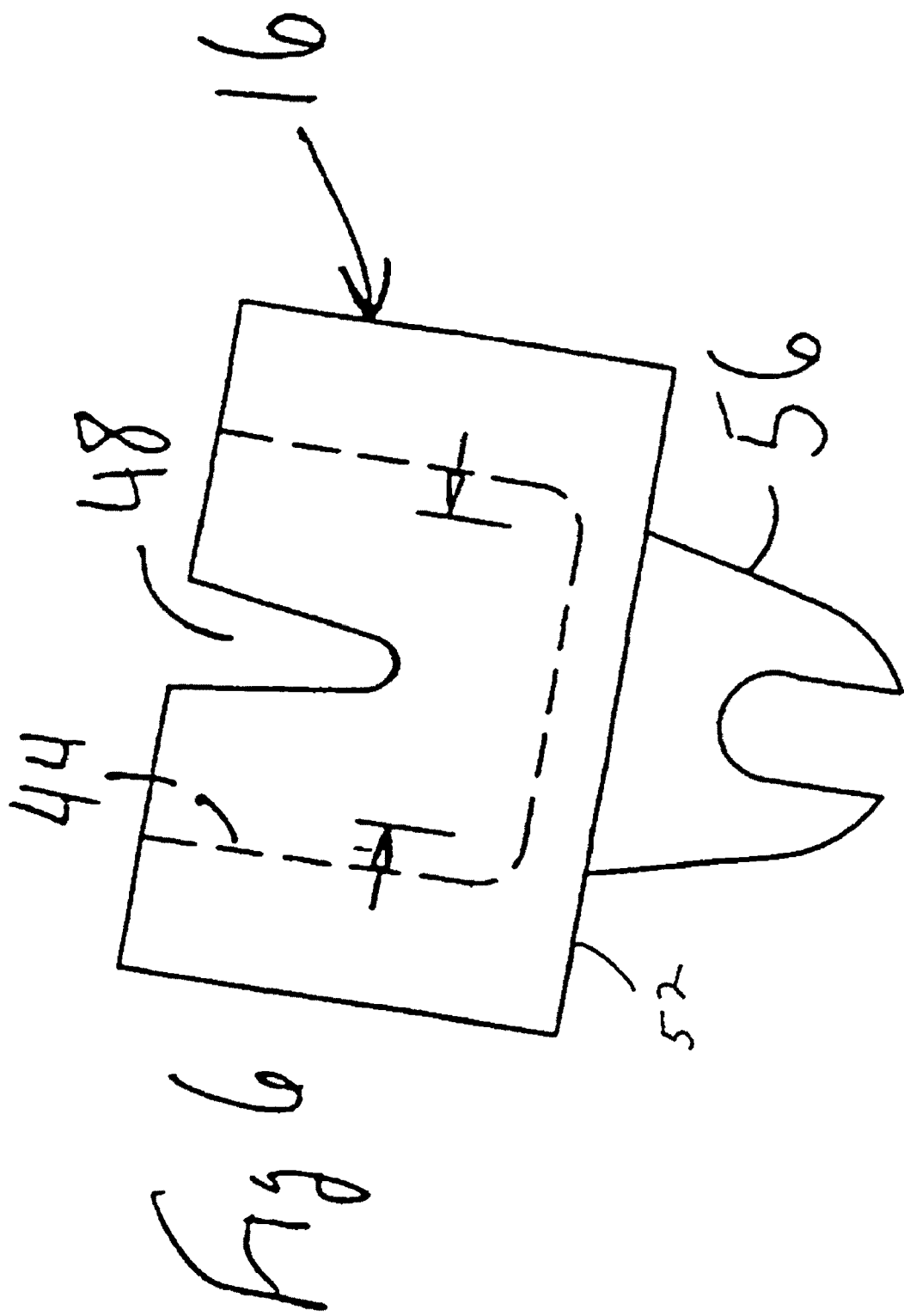
FIG. 6 is an end view of the carrier portion of FIG. 4.

With reference to FIGS. 4-6, the carrier 16 can be seen to comprise a container having a plurality of individual compartments 44 which are separated by barriers 46. While seven compartments are shown to hold the seven food components 14a-g, any number of compartments and food components can be used. Each barrier has a V-shaped notch 48 formed therein which are aligned along the elongate length of the carrier 16. The individual food components 14a-g are each placed in one of the compartments 44 so that they are spaced along the elongate length.

From the bottom 52 of the carrier extends two extensions 54 and 56 which snap fit onto the carrier conveyor chain 18 in a manner described hereinafter.

Figure 7:
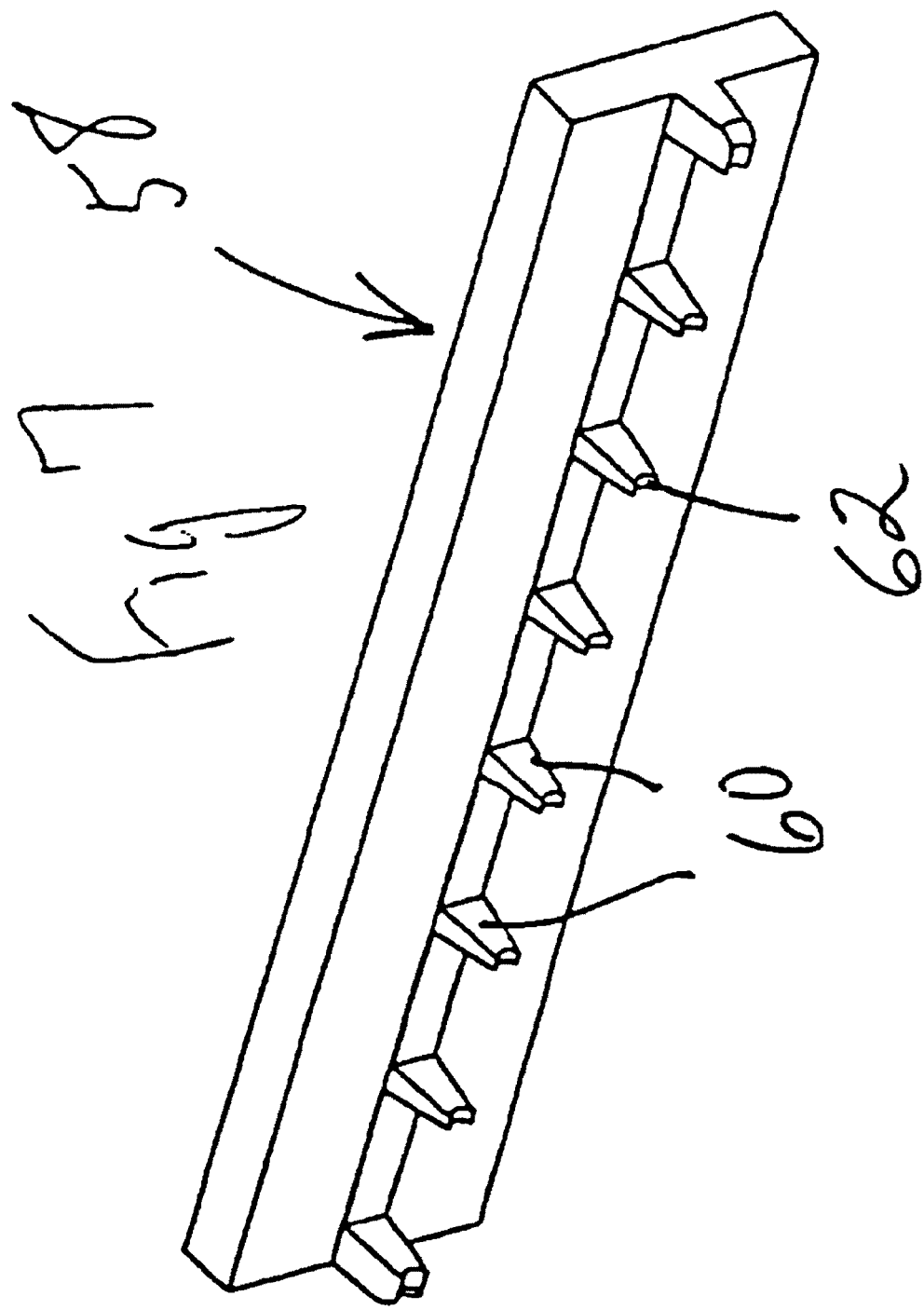
FIG. 7 is a perspective view of a top for the carrier.
Figure 8:
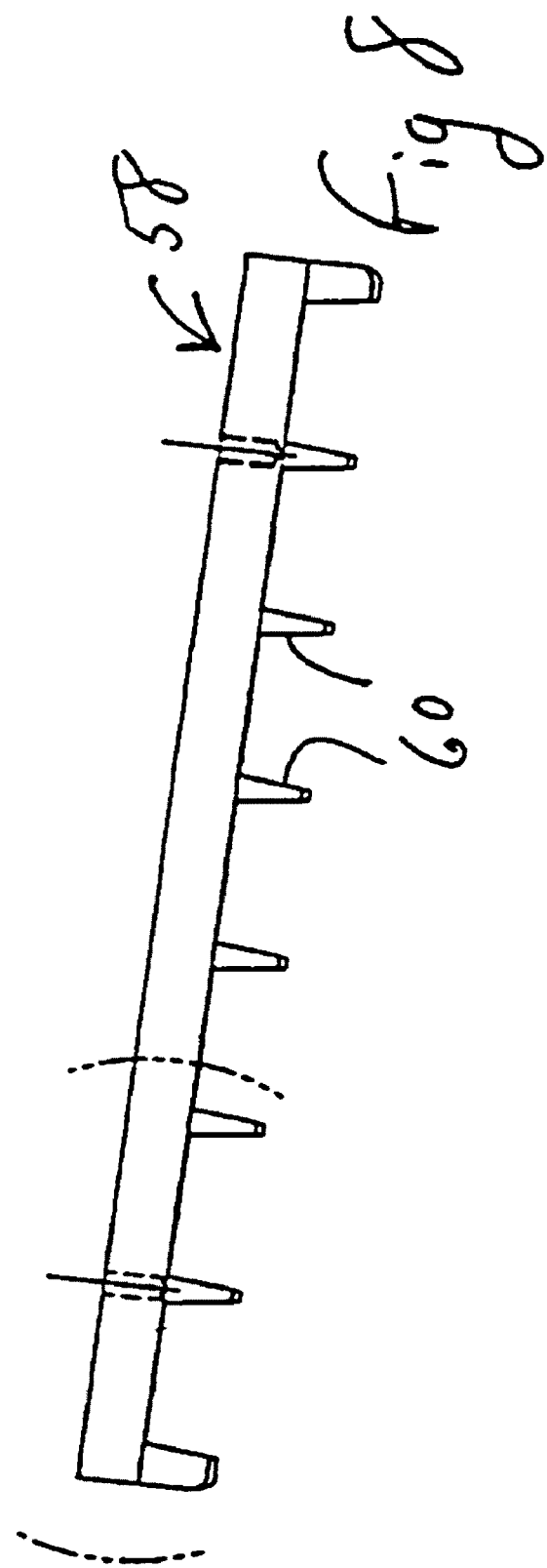
FIG. 8 is a side view of the top.
Figure 9:
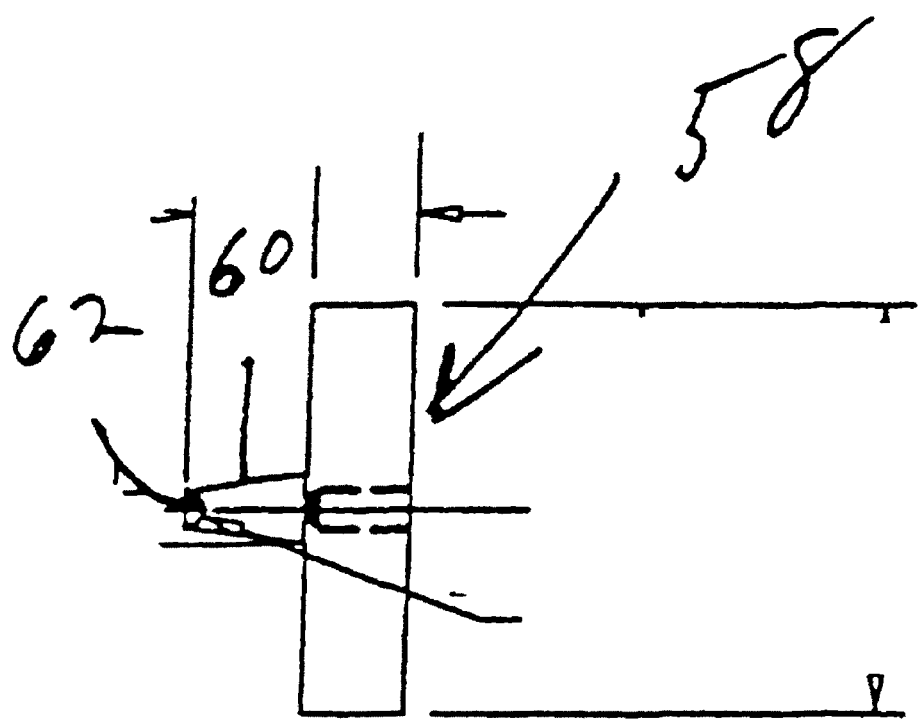
FIG. 9 is an end view of the top.

With reference to FIGS. 7-9, a top 58 used with the carrier 16 is illustrated. The top 58 has a series of V-shaped extensions 60 which fit into the V-shaped notches 48 when the top is placed on the carrier 16, as seen in FIG. 10. The end of each extension 60 has a semi-cylindrical end surface 62 as shown. The bottom of the V-shaped notch 48 and the surface 62 define a circular aperture through each barrier 46 for passage of the stick through the food components as will be described hereinafter. The top is mated with carrier 16 in the predetermined position by lowering a presser foot 190 during the skewering process. Two tops 58 are secured to presser foot 190.

Preferably, both the carrier 16 and top 58 are formed of a food grade material. For example, a glass filled Teflon (polytetrafluoroethylene) such as Delrin can be used. Alternatively, the carrier 16 and top 58 can be made of stainless steel, other metals, other plastics, ceramics or even wood, as examples.

Figure 2:
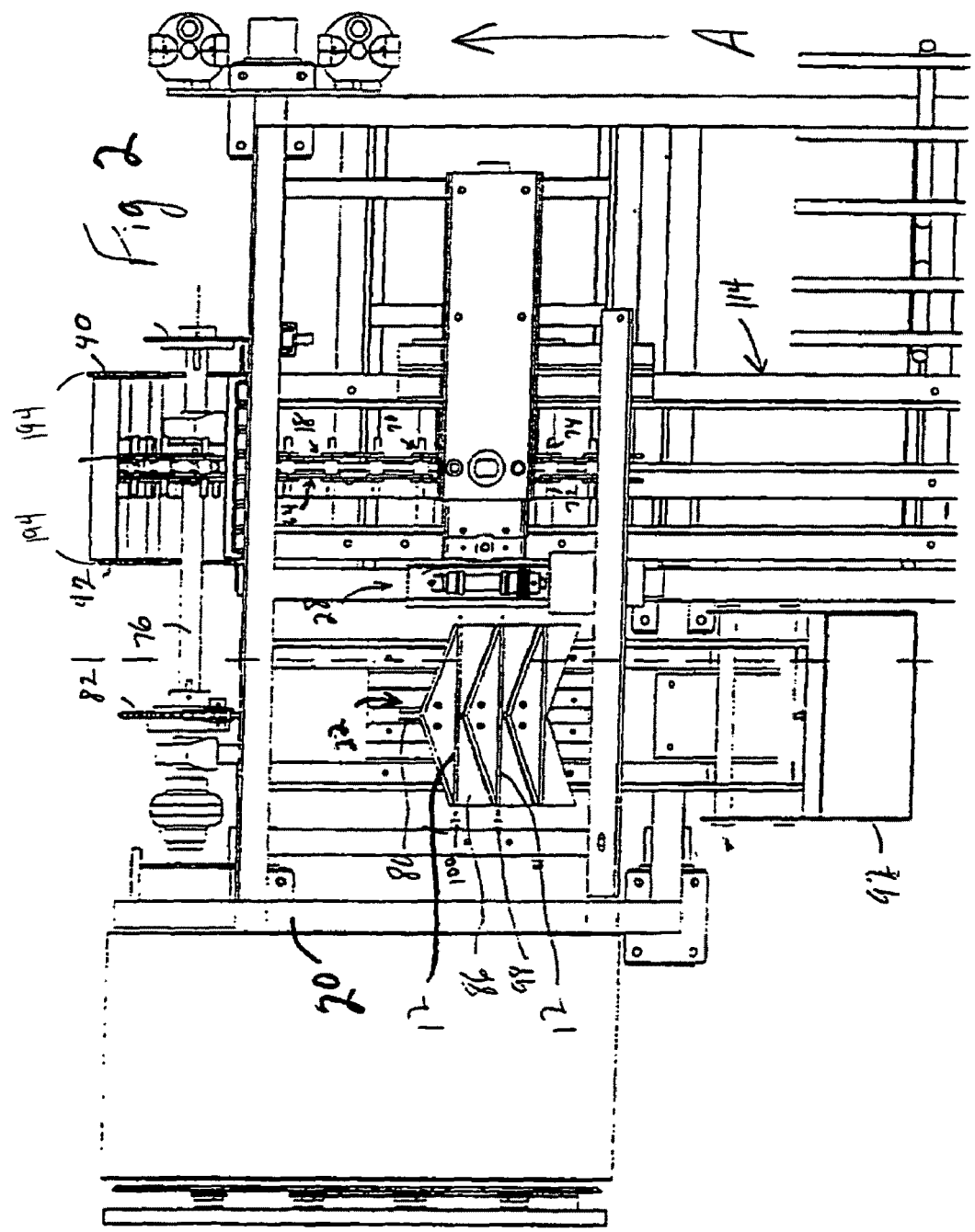
FIG. 2 is a plan view of a portion of the first embodiment.
Figure 3:
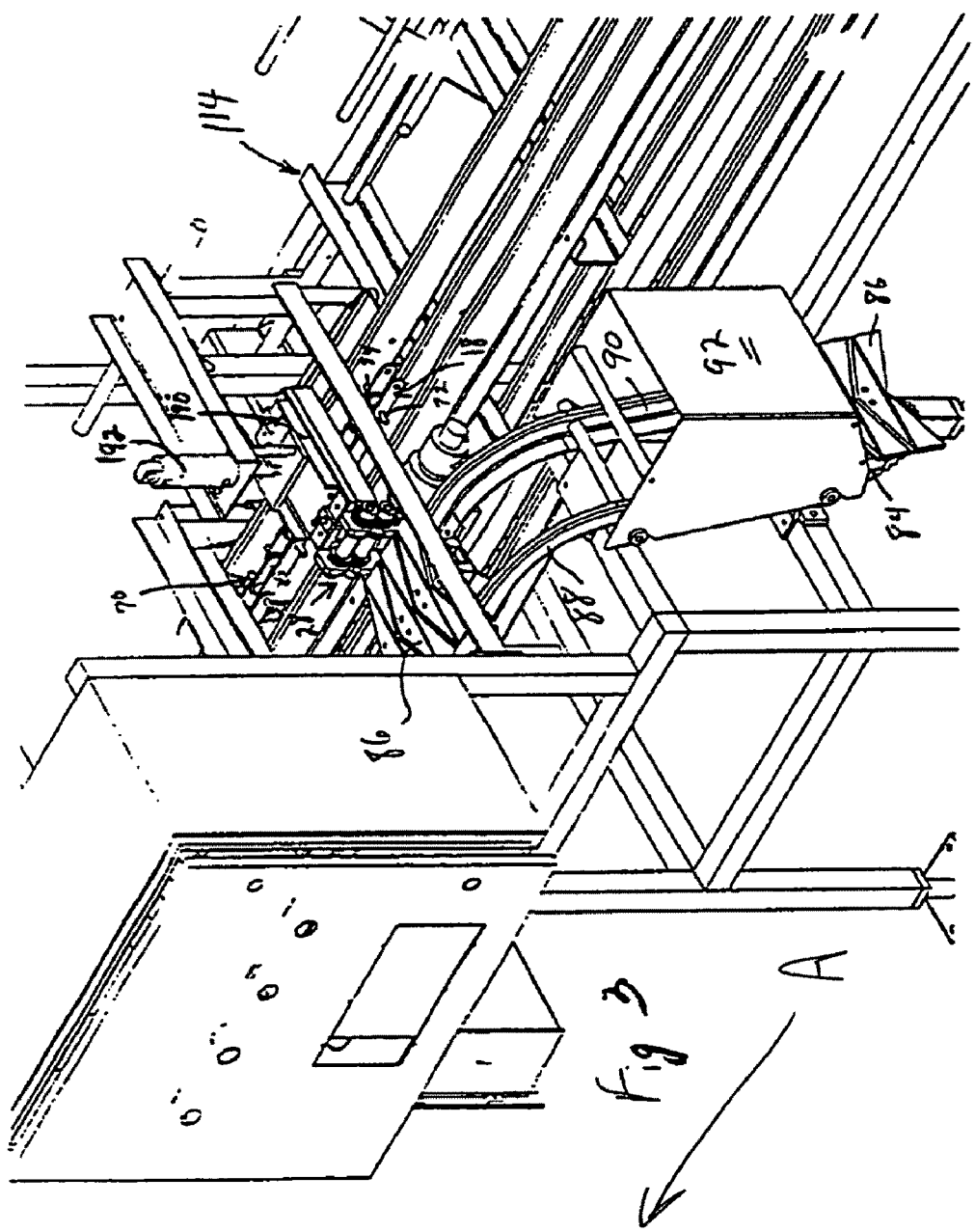
FIG. 3 is a rear perspective view of a portion of the first embodiment.

With reference now to FIGS. 2, 3 and 16, the carrier conveyor chain 18 can be seen to comprise a continuous chain 64 extending between a front driving sprocket 66 and a rear idler sprocket 68. Each link in the chain 64 has a pin 70 which extends transverse the direction of motion A of the upper side of the chain conveyor belt 18. Each pin 70 has a portion 72 on one side of the chain and a portion 74 on the other side of the chain. The extensions 54 and 56 on carriers 16 snap fit over portions 72 and 74, respectively, to secure the carrier 16 to the carrier conveyor chain 18 for movement therewith. Typically, an operator at the rear of the machine will either place a carrier 16, with the food components therein, on a free pin 70 for movement from the rear of the machine toward the front or fill the empty compartments in a carrier 16 already on the conveyor chain 18. The conveyor chain 18 can be driven by any suitable device, and is seen to be driven by a drive shaft 76 by a stepping motor, not shown.

With reference now to FIGS. 2, 3, 14 and 15, the stick conveyor 22 will be described. The stick conveyor also includes a chain 80 which extends around a driving sprocket 82 and an idler sprocket 84. Individual stick flights 86 are positioned along the chain and bolted thereto. Guide rails 88 and 90 guide the stick flights, and thus the chain, on a path past a stick storage bin 92 to the predetermined position 20 for insertion of the sticks within the food components. As seen, the flights 86 will move in a direction angled from vertical past an open side of the storage bin 92. The flights effectively form one side wall of storage bin 92. Stick grooves 96 in each flight 86 are shaped so that a stick will be picked up from the storage bin 92 and carried by the flight to the predetermined position 20. Preferably, the stick conveyor 22 is driven by the same motor and drive shaft 76 that drives the carrier conveyor chain 18 so that the motion of the carrier conveyor chain 18 and the stick conveyor 22 are synchronized.

With reference to FIGS. 1-3 and 11-13, the operation of the insertion device 28 will be described. The kebab machine 10 positions a pair of carriers 16 with food components therein at the predetermined position 20 at the same time that the stick conveyor 22 positions a pair of flights 86 at the predetermined position, each flight containing a stick 12. In the predetermined position, a pair of air jets 98 and 100 are positioned proximate the ends 102 of the sticks which face away from the carriers 16. Typically, end 102 will be a planar surface, but it can also be pointed, if desired. The machine 10 will control a jet of air discharged from the air jets 98 and 100 onto the ends 102 of the sticks to drive the sticks forward in direction B into the insertion device 28.

The insertion device 28 includes plates 110 and 112 which are rigidly mounted on the frame 114 of the machine 10. Shafts 116 and 118 pass through holes 120 formed in the plates 110 and 112 and are guided by bearings 122 for motion in direction B. One end of each of the shafts 116 and 118 is mounted on a plate 126, while the other ends of the shafts are mounted to an angle 128. A motor mount assembly 130 is mounted on angle 128 and a motor 132 is mounted on the assembly 130. An air cylinder 134 is mounted at its end to the frame 114 while the end of the piston 136 of the air cylinder 134 is mounted to the plate 126. Brackets 138 and 140 extend vertically upward from the assembly 130 and are providing with aligned pairs of holes 142 and 144.

Figure 17:
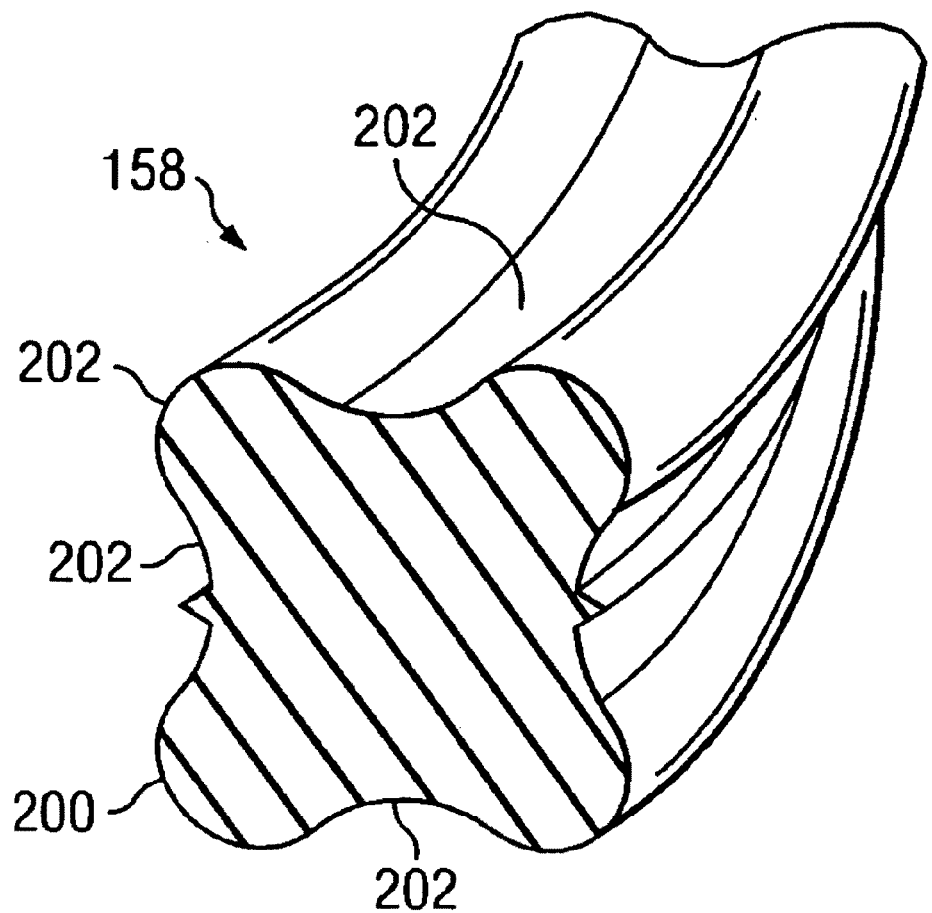
FIG. 17 is an illustrative view of a Quad Ring® seal utilized in the present invention.

A shaft 146 is received in aligned holes 142 and has at one end a gear 148 mounted thereon. Bearings 150 support the shaft 146 for rotational motion in the holes 142. As best seen in FIG. 12, the shaft 146 has separate pairs of grooves 152 for receiving snap rings 154 between each adjacent pair of snap rings 154 are washers 156 and a resilient four lobe seal ring 158, such as sold by Minnesota Rubber and QMR Plastics, 3630 Wooddale Avenue, Minneapolis, Minn. 55416, as the Quad Ring® seal. With reference to FIG. 17, the four lobe seal ring 158 can be seen to include four sealing lobes 200 and four generally V-shaped grooves 202 between each adjacent pair of sealing lobes 200. By varying the thickness or number of washers 156, the compression of seal ring 158 between the snap rings can be varied, which changes the configuration of the grooves 202. With a pair of seal rings 158 close to each other and properly compressed by the snap rings, a stick 12 will be caught in the facing V-shaped grooves 202 at the radially outer surface 204 of the mating seal rings 158 to tightly grip the stick 12 there between.

Similarly, a shaft 160 is supported for rotation in the holes 144 and mounts a gear 162 on the end thereof. Gears 148 and 162 are meshed together and gear 162 also meshes with the drive gear 164 on the shaft of the motor 132.

The adjacent resilient seal rings 158 on shafts 146 and 160 are sufficiently squeezed toward each other, as noted previously, to form a nip 166 therebetween to receive a stick 12 between facing grooves 202. By rotating the motor 132 in the correct direction, the shafts 146 and 160 are rotated in the direction of arrows C to drive a stick 12 inserted between contacting seal rings 158 in the insertion direction B and through the food components 14a-g in the adjacent carrier 16. Air cylinder 134 drives the insertion device 28 sufficiently close to the adjacent carrier 16 to allow the sticks to be driven into the adjacent carrier 16 with considerable force to skewer the food components without snapping the stick 12. The circular aperture defined between extensions 60 of top 58 and V-shaped notches 48 in carrier 16 support the stick 12 as it is driven through the food components as well. The degree of frictional engagement between the stick 12 and the seal rings 158 can be varied by varying the thickness or quantity of the washers 156, as noted above. Seal rings 158 are preferably of a suitable flexible material, such as food grade silicon rubber.

As can be appreciated, as seen in FIG. 13a, the air jets 98 and 100 blow the sticks 12 in the predetermined position in direction B into the nips 166 between adjacent seal rings. The seal rings are rotated by the motor 132 so that the front point 170 of each stick is caught by the nip 166 between the seal rings 158 and the stick is then driven in the insertion direction into the carrier and through the food components.

After the stick has been driven through the insertion device 28, the air cylinder 134 is activated to move the shafts 116, 118, angle 128, brackets 138 and 140 and structure supported thereon away from the carriers 16 to permit the carriers to move in the direction A for subsequent removal of the kebab from the carriers. The sticks usually extend ¼" to ¾" outside the ends of the carrier 16 after skewering.

Figure 11A:
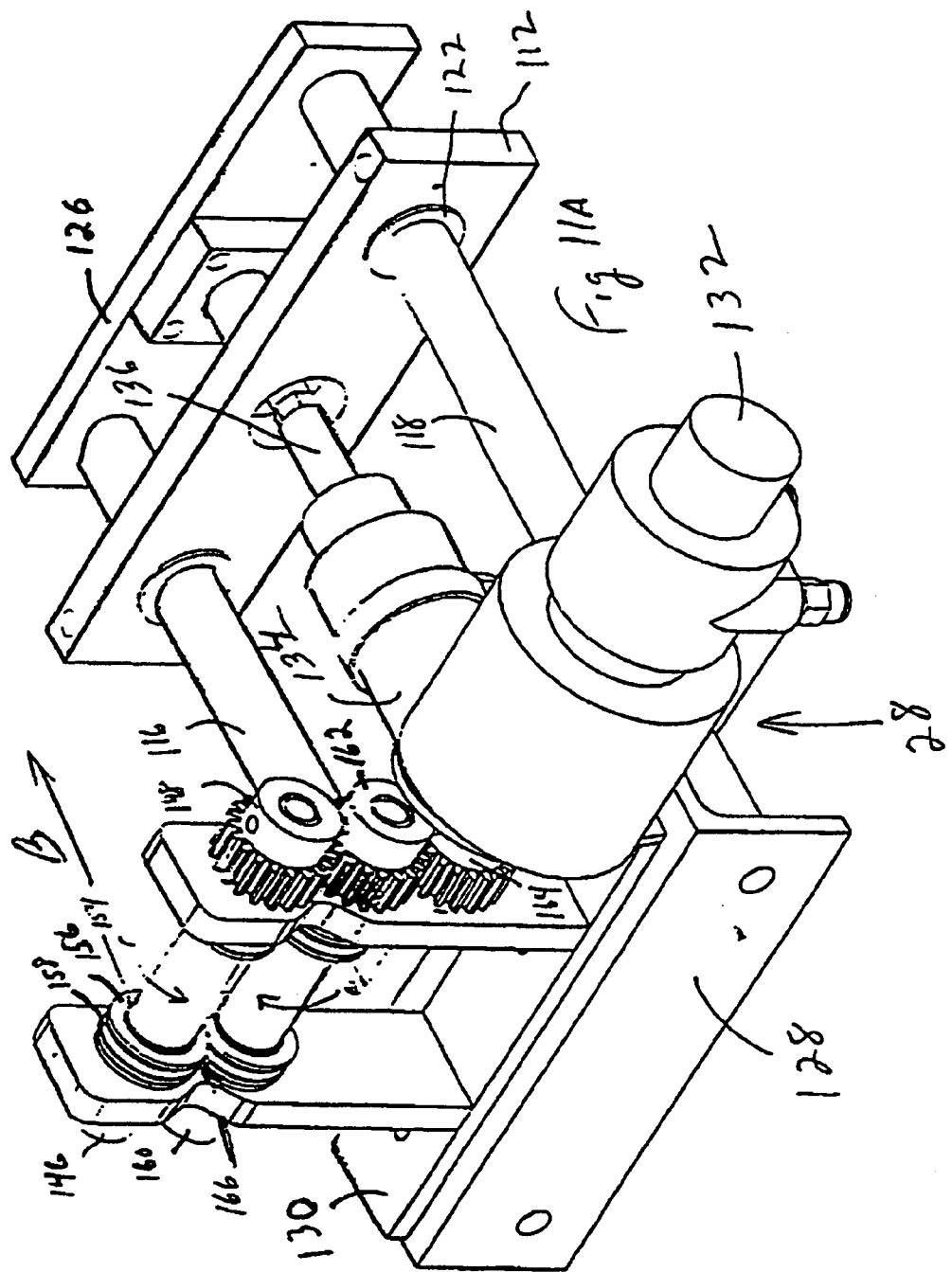
FIG. 11A is a perspective view of the stick driving device of the first embodiment.

With reference to FIGS. 11B and 11C, a fiber optic sensor 300 can be used to insure proper stick insertion before the carriers 16 are moved in direction A. The fiber optic sensor 300 includes a light transmitter 302 and a light sensor 304. The light transmitter 302 is mounted in bracket 138 while the light sensor 304 is mounted in bracket 140. The light transmitter 302 directs a beam of light toward the light sensor 304 which intersects the path of both sticks 12 being inserted by the insertion device 28. When the sticks are properly inserted, the ends 102 of the sticks have passed the light beam from the light transmitter 302 and the beam thus falls on the light sensor 304. This provides a signal to the control system of the kebab machine 10 that the carrier 16 can be moved in direction A. However, if one or both of the sticks 12 being inserted into the carriers 16 have not been properly inserted by the insertion device 28, a portion of the stick or sticks improperly inserted will lie in the path of the light beam from transmitter 302 and will block the light beam from falling on the light sensor 304. If the carrier 16 were to move in direction A in such a condition, the end of the stick or sticks 12 would interfere with the insertion device 28, usually causing the stick or sticks to break. When the presence of a stick is detected, the control system of the kebab machine 10 will conclude an improper insertion has occurred. Preferably, the control system will cause the insertion device 28 to repeat the insertion steps to insert the sticks 12 once or twice more in an effort to achieve proper insertion. If proper insertion is still not sensed by the fiber optic sensor 300 after the chosen number of reinsertion attempts, the control system can halt operation of the kebab machine and attention of the machine operator will be required.

During the insertion process, a presser foot 190 is actuated downward by an air cylinder 192 to insert and hold the tops on the carriers 16 to prevent motion of the food components 14a-g as they are skewered by the sticks. After skewering, the presser foot 190 is lifted by air cylinder 192 or a spring.

As the carriers 16 are carried forward on the carrier conveyor belt 18 in direction A after sticks 12 have been inserted, the ends of each stick come into engagement with the surfaces 194 on cam plates 40 and 42 which drive the stick and skewered food components 14a-g out of the carrier and into a suitable receptacle for further processing.

As can be understood, an efficient apparatus and method for preparing a kebab is disclosed. The flights 86 can be readily removed and replaced by flights designed for carrying another size stick, if desired. A cover, preferably clear Lexan, can cover the operation of the stick insertion for safety reasons, if desired.

The rotation of the drive shaft 76 for the driving sprockets 66 and 82 of the carrier conveyor belt 18 and stick conveyor 22 can be driven by a stepper motor. The stepper motor can be controlled by a sensor sensing the individual points 202 on a control wheel 204 illustrated in FIG. 1 also rotated by shaft 76. The length of the sticks 12 is not critical to the operation of the machine as the air jets will blow the sticks in direction B regardless of length into the nips 166 of the insertion device 28. While two sticks are illustrated as being inserted simultaneously, four or any other number can be inserted by simply increasing the number of positions in the insertion device 28.

Figure 18:
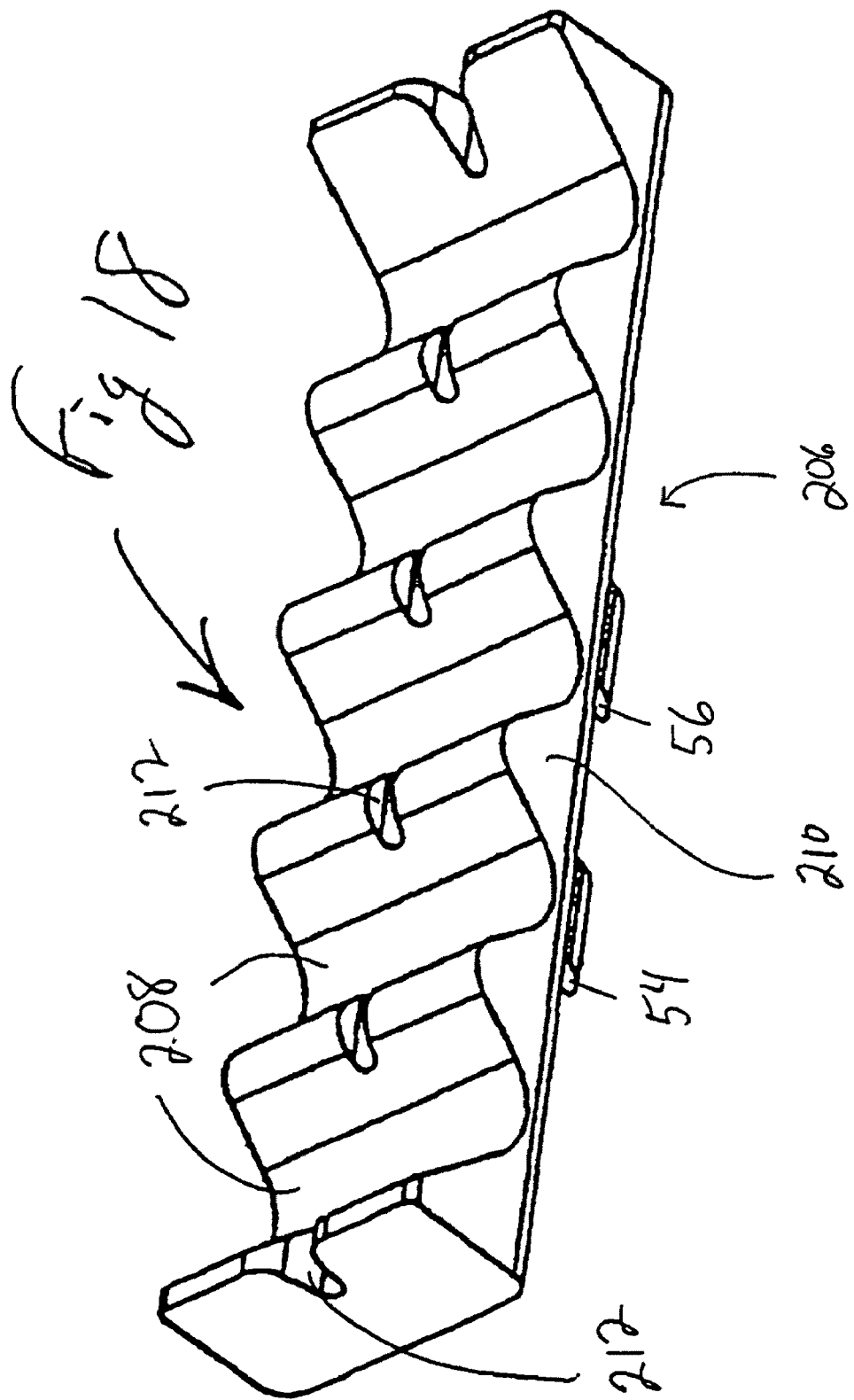
FIG. 18 is a perspective view of a first modified carrier utilized in a first embodiment.
Figure 19:
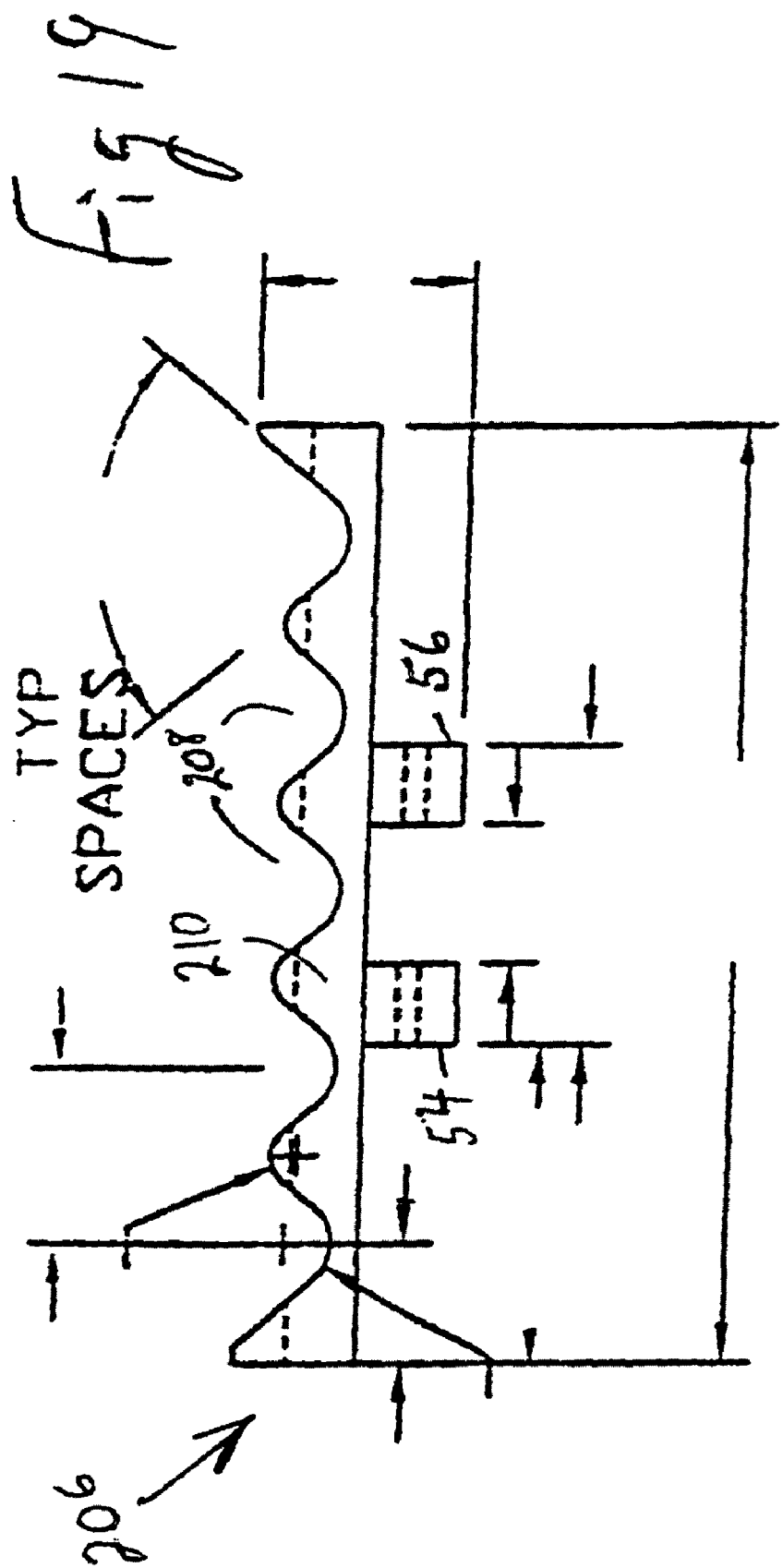
FIG. 19 is a side view of the first modified carrier.
Figure 20:
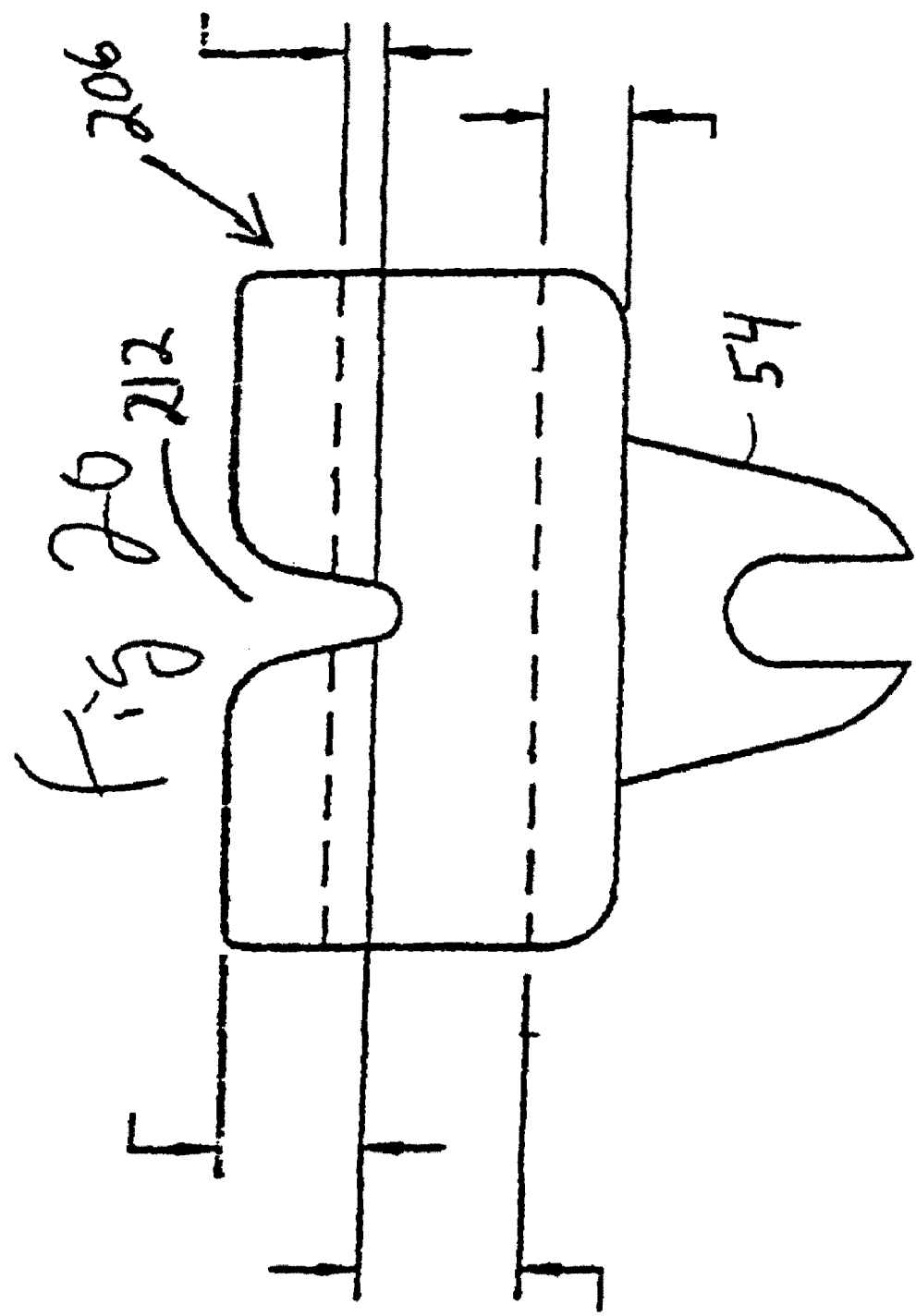
FIG. 20 is an end view of the first modified carrier.

With reference now to FIGS. 18-20, a first modified carrier 206 will be described. The first modified carrier 206 has a series of curved depressions 208 for receiving the food items. The depressions 208 are open at the sides 210 of the carrier 206 to receive elongate food items. Notches 212 permit passage of stick 12 through the carrier 206.

As carrier 16, the carrier 206 has extensions 54 and 56 to snap fit onto the carrier conveyor chain 18.

Figure 21:
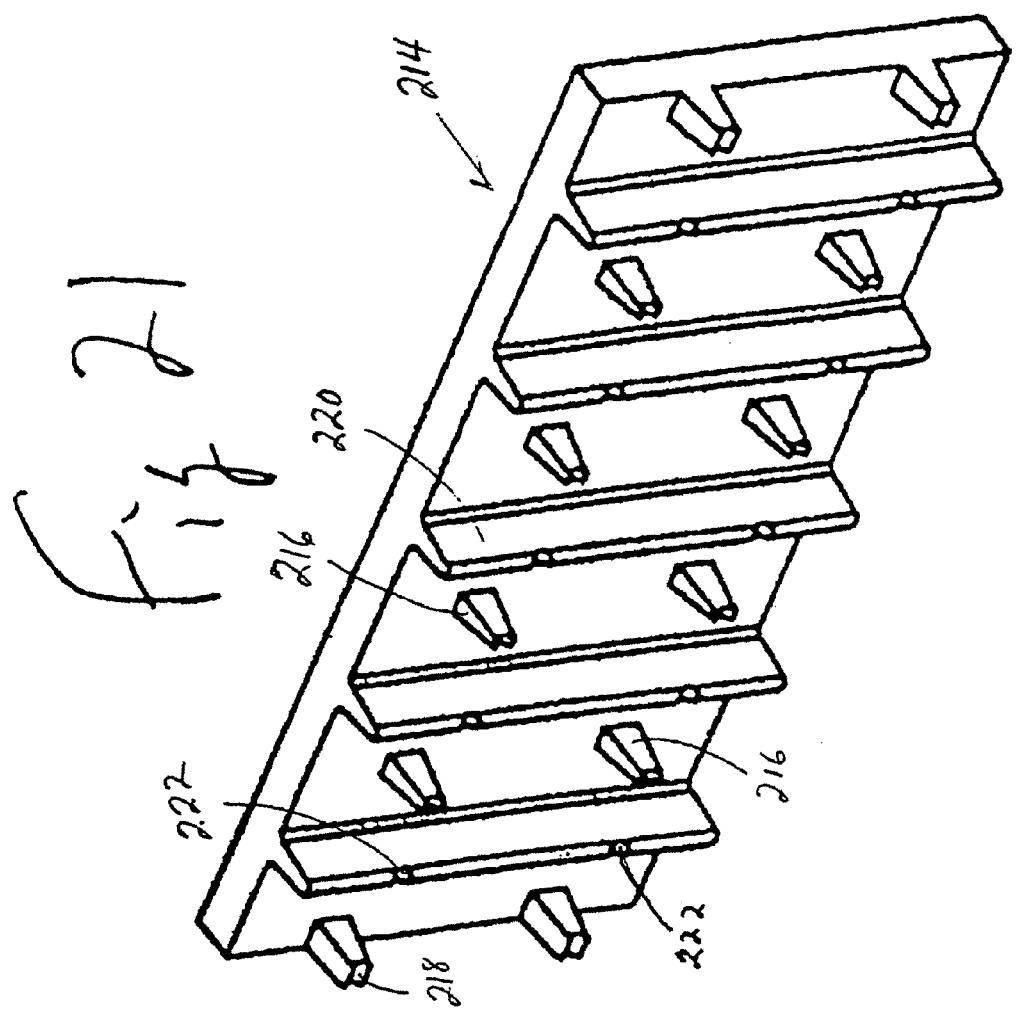
FIG. 21 is a perspective view of a presser foot utilized with the first modified carrier.
Figure 22:
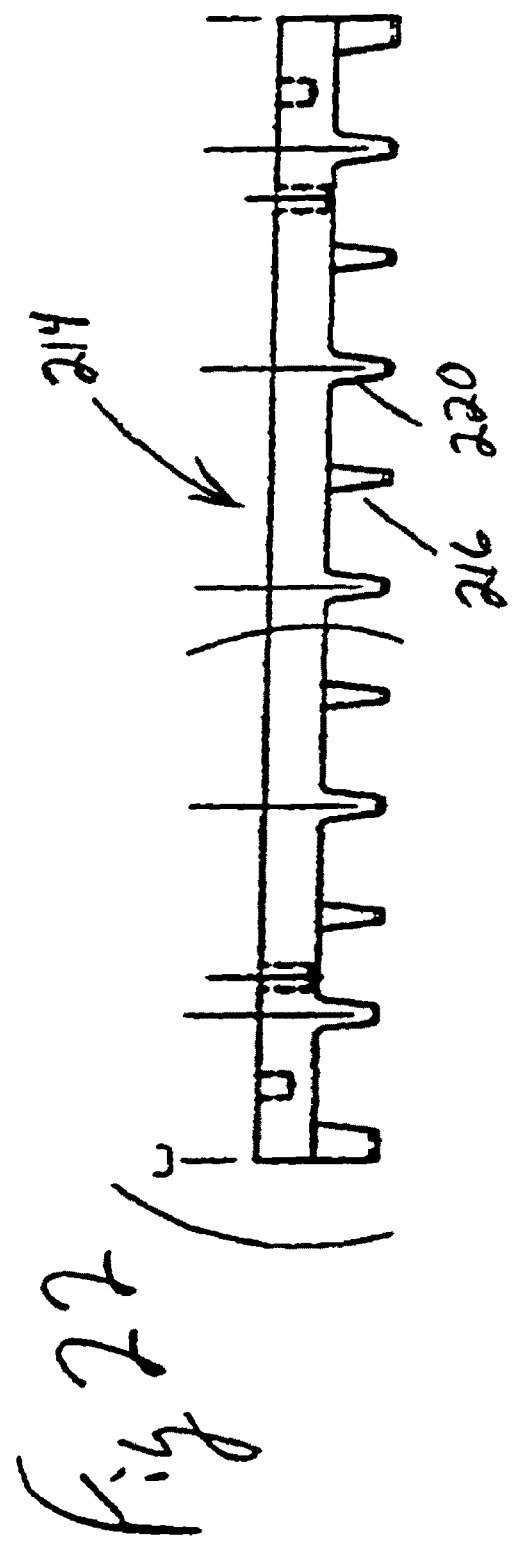
FIG. 22 is a side view of the presser foot of FIG. 21.

With reference now to FIGS. 21 and 22, there is illustrated a presser foot 214 which replaces the presser foot 190 when carriers 206 are utilized. As can be seen in the figures, the presser foot 214 has a dual set of V-shaped extensions 216 which extend downwardly and into the notches 212 when the presser foot 214 is pressed down on the side by side carriers 206 by the air cylinder 192. Thus, the single presser foot 214 serves the same function as a pair of tops 58. The extensions 216 also end in semi cylindrical end surface 218 which defines a circular aperture for passage of the stick 12. Also, presser foot 214 has a series of full width barriers 220 which extend into the curved depressions 208 to hold the food items therein. Each barrier has a pair of notches 222 to permit passage of the sticks 12.

Figure 23:
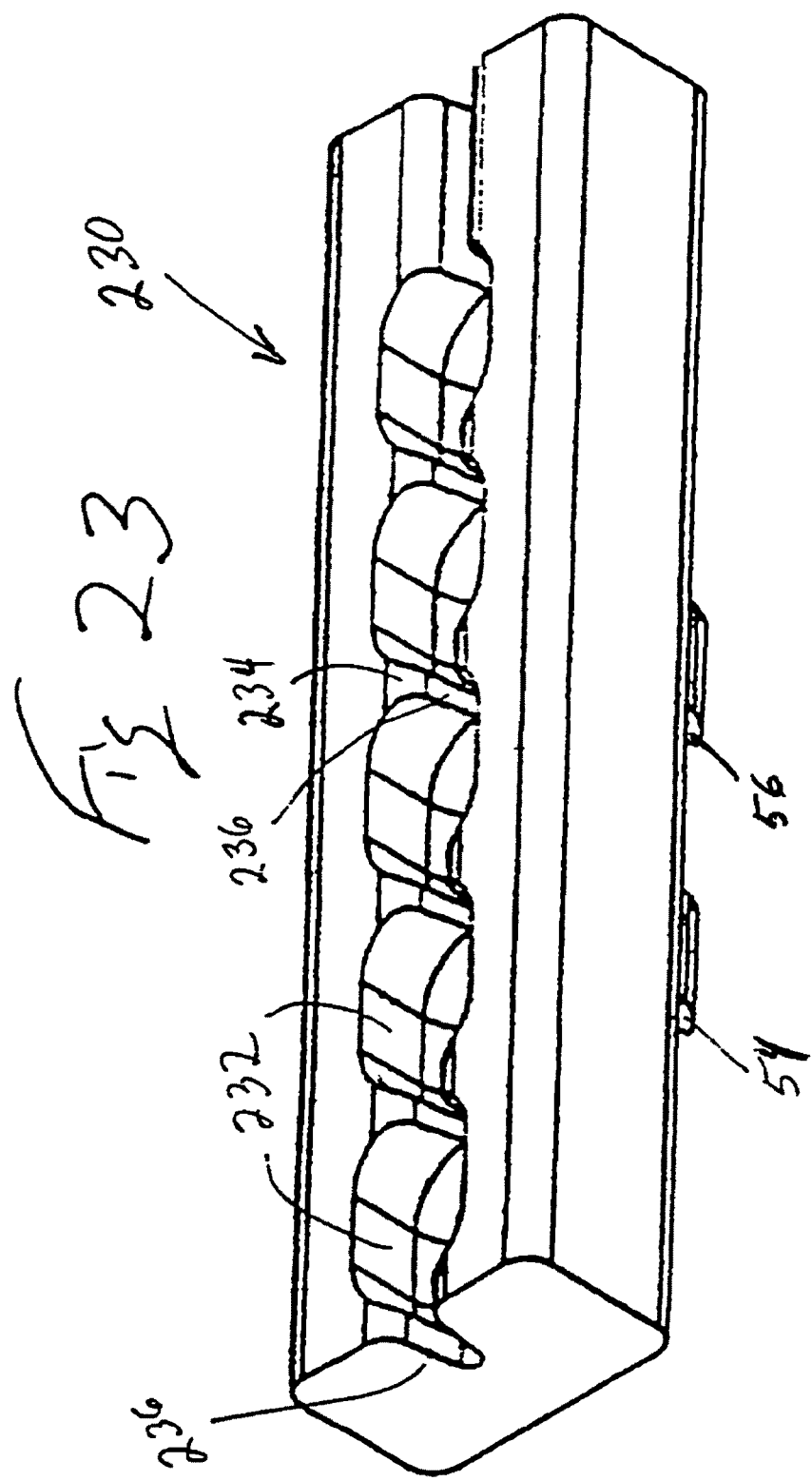
FIG. 23 is a perspective view of a second modified carrier utilized in the first embodiment.
Figure 24:
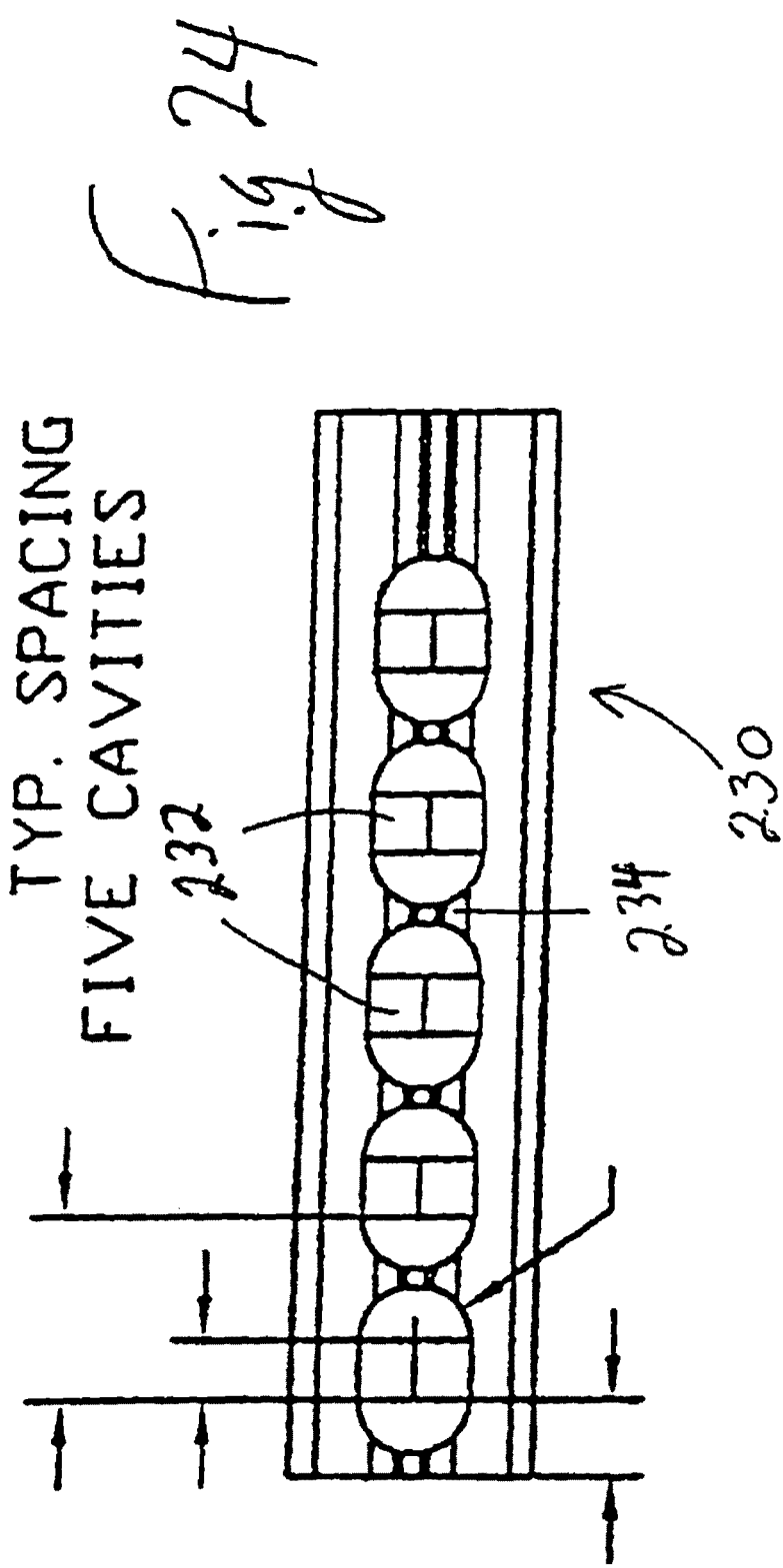
FIG. 24 is a top view of the second modified carrier.
Figure 25:
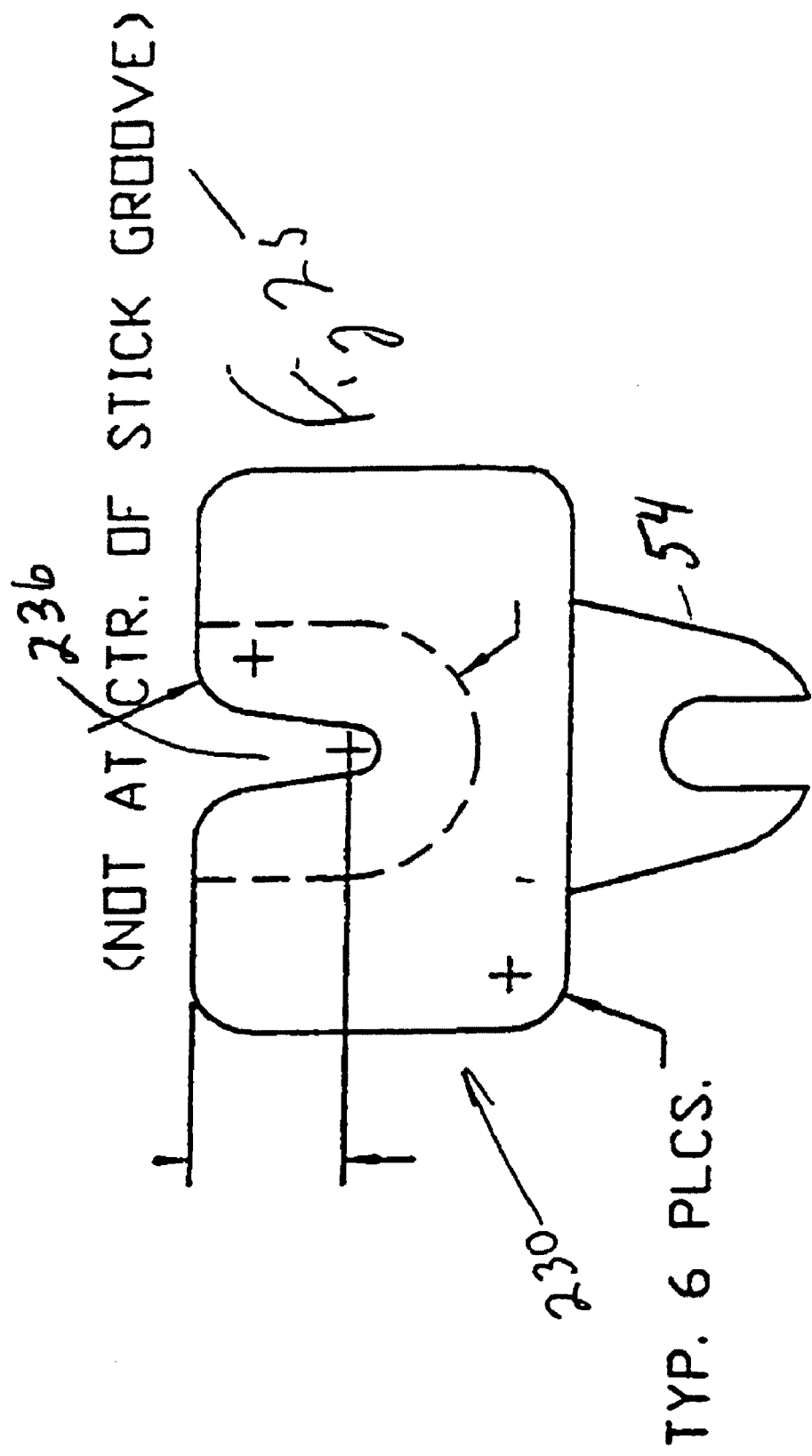
FIG. 25 is an end view of the second modified carrier.

With reference to FIGS. 23-25, a second modified carrier 230 will be described. The second modified carrier 230 is specifically adapted for forming a kebab of chocolate eggs or other egg-like candies due to the egg-shaped compartments 232 formed into the carrier 230. Barriers 234 separate each of the compartments 232 and have V-shaped notches 236 formed therein for passage of the sticks 12.

Figure 26:
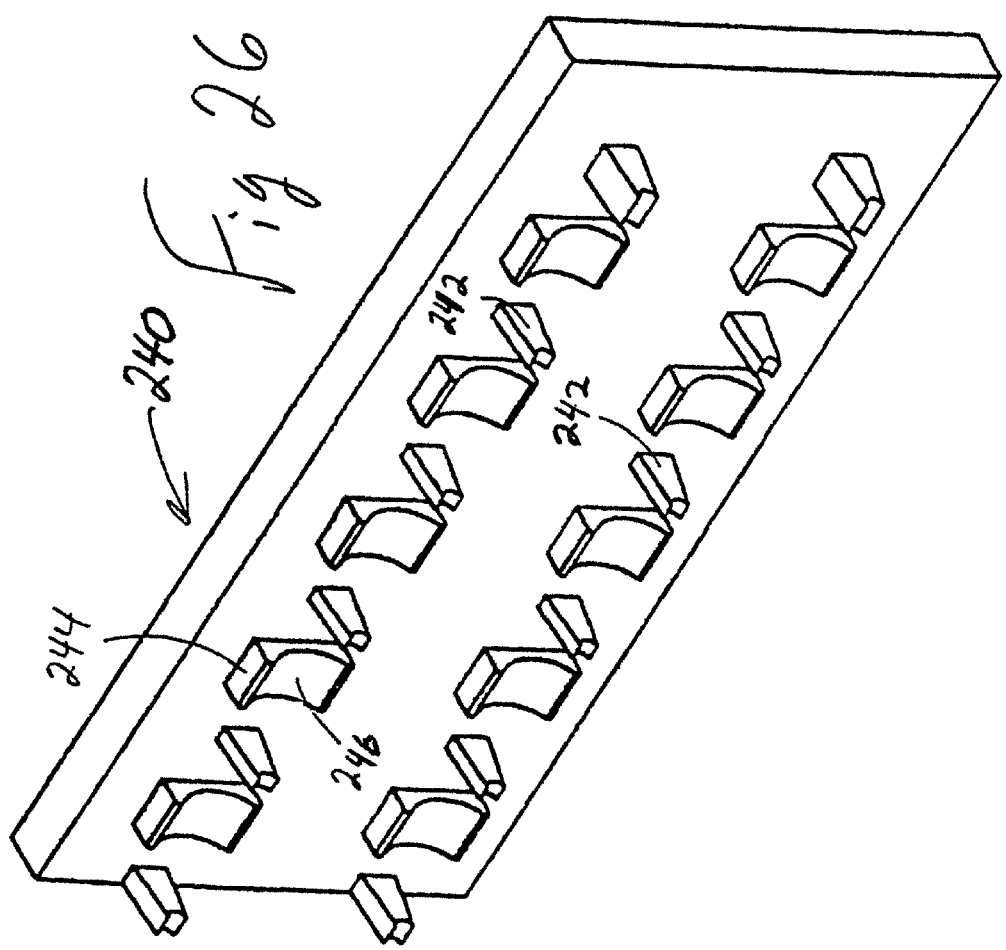
FIG. 26 is a perspective view of the presser foot used with the second modified carrier.
Figure 27:
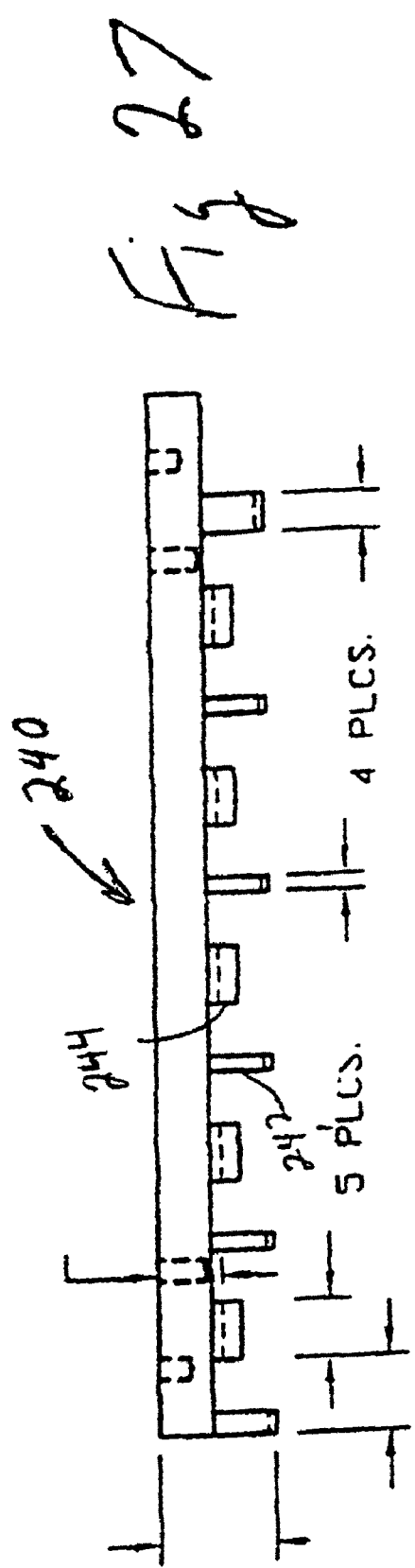
FIG. 27 is a side view of the presser foot of FIG. 26.

With reference now to FIGS. 26 and 27, there is shown a presser foot 240 which is utilized when carriers 230 are used. The presser foot 240 has a dual set of V-shaped extensions 242 to mate with v-shaped notches 236 and define a circular aperture through each barrier for passage of the sticks 12. Again, the presser foot 240 is utilized with adjacent pairs of carriers 230. Also, presser foot 240 is provided with a dual set of a series of extensions 244 having semi-cylindrical surfaces 246 at the end thereof which form a top for each individual egg-shape compartment 232. The surfaces 246 have a cylindrical radius continuing the radius of the cylinder like shape of the egg-shaped compartments 232. This provides complete circumferential support for the chocolate egg or other type of candy, or any other type of food item, within the carrier 230 when skewered by sticks 12.

Again, the first modified carrier 206, presser foot 214, second modified carrier 230 and presser foot 240 are formed of a food grade material, such as glass filled polytetrafluoroethylene, such as Delrin.

Figure 28:
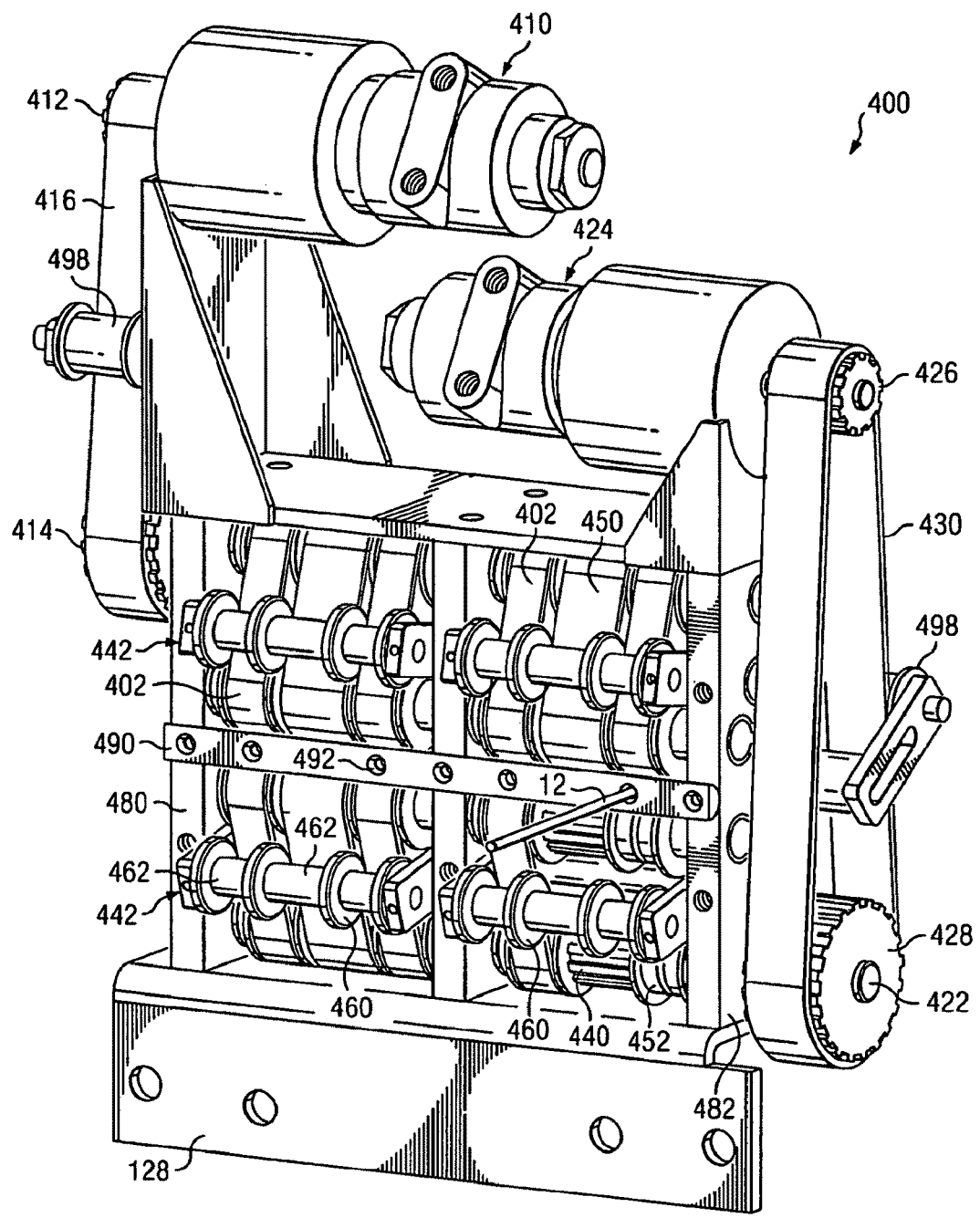
FIG. 28 is a perspective view of a modified insertion device.
Figure 29:
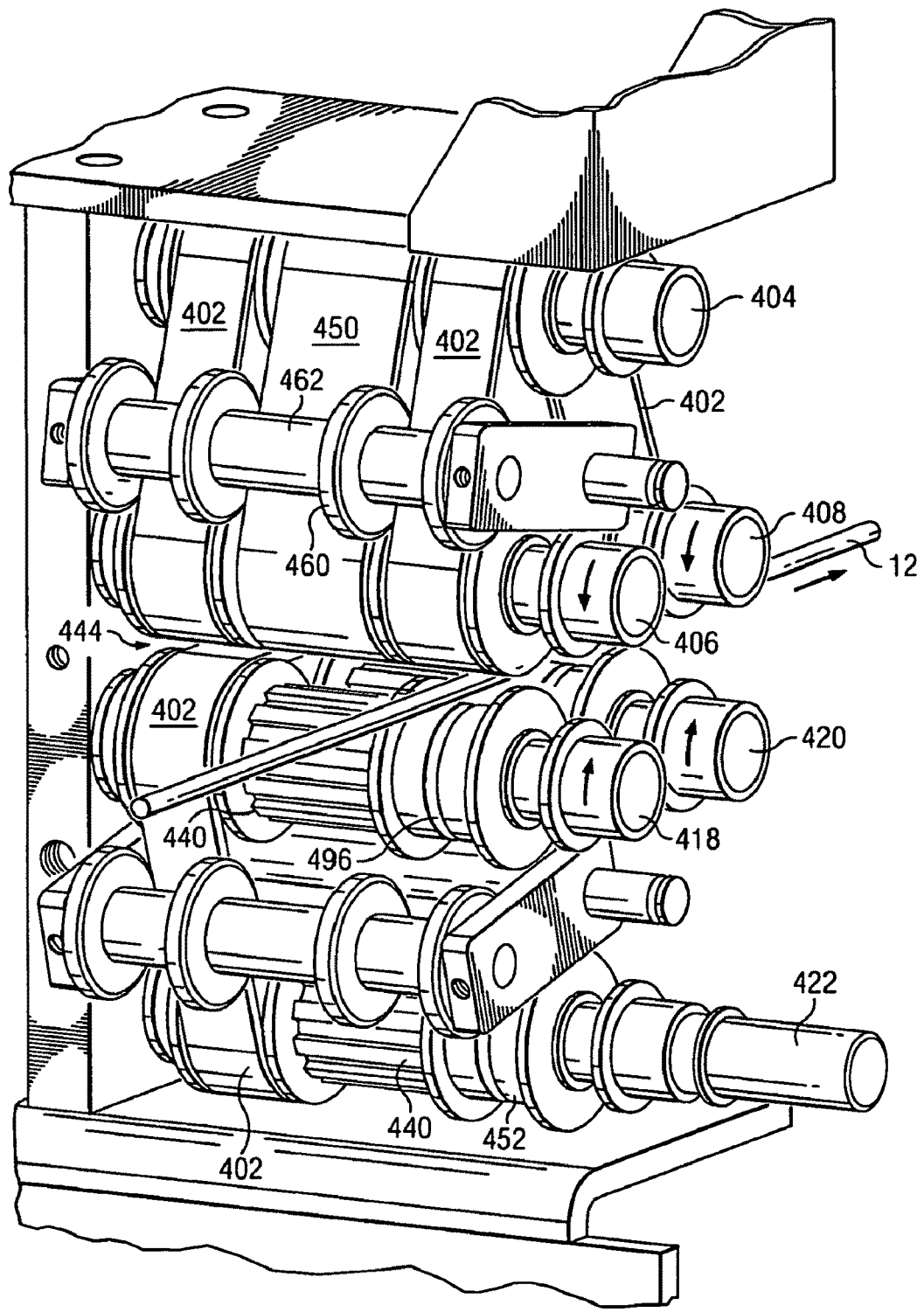
FIG. 29 is a cutaway perspective view of a portion of the insertion device of FIG. 28.
Figure 30:
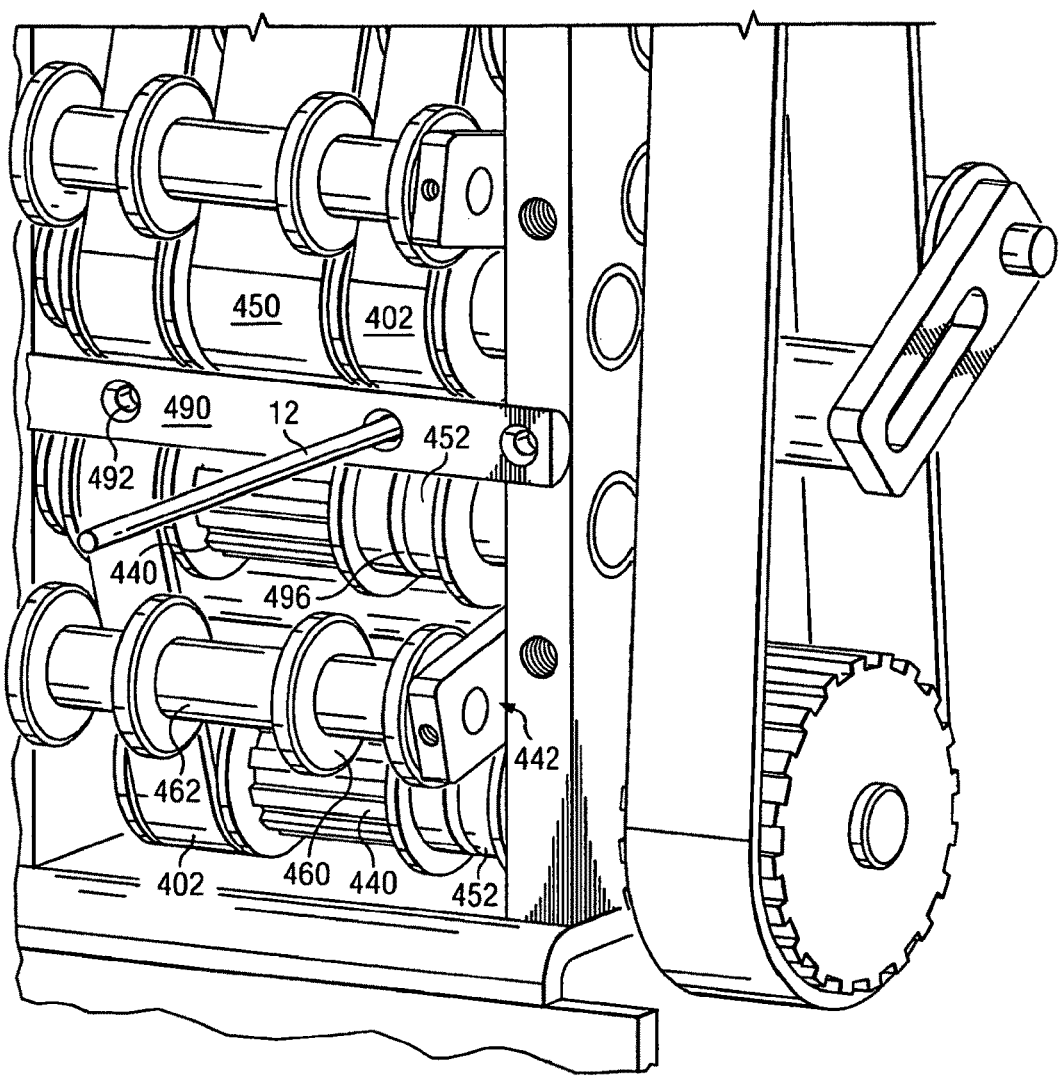
FIG. 30 is a detail view of the insertion device of FIG. 28.
Figure 39:
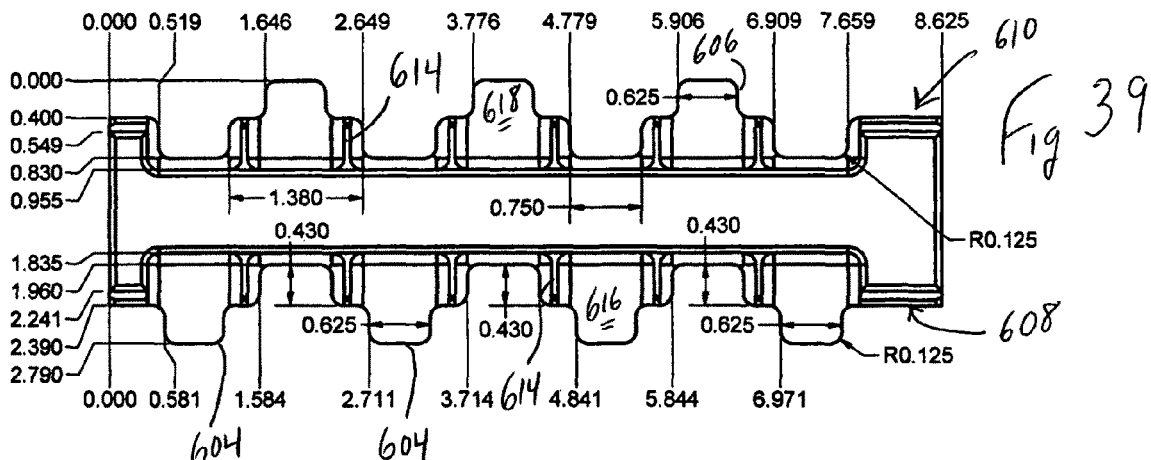
FIG. 39 is a top view of the carrier element of FIG. 37.

With reference now to FIGS. 28-30, a modified insertion device 400 will be described. The device 400 replaces the insertion device 28. Insertion device 400 utilizes smooth belts 402 to contact the sticks 12 to drive them forward. The belts 402 are preferably formed of urethane.

The insertion device 400 mounts three upper shafts 404, 406 and 408 in spaced brackets 480 and 482 for rotation about their elongate axis. The shaft 404 is rotated directly by motor 410 acting through a drive gear 412 on the shaft of motor 410, a driven gear 414 on the shaft 404, and the drive belt 416. Drive belt 416 is tensioned by a tensioner 498. Similarly, three lower shafts 418, 420 and 422 are mounted in brackets 480 and 482 for rotation about their elongate axis. A motor 424 rotates shaft 422 directly through a drive gear 426 on the shaft of the motor 424, a driven gear 428 on the shaft 422 and a drive belt 430. Drive belt 430 is also tensioned by a tensioner 498.

Smooth wheels 452 and toothed wheels 440 are mounted along the shafts 404-408 and 418-422 for rotation with the shafts as shown (the lower rightmost belt 402 and belt 450 have been removed in FIGS. 28-30 to reveal the wheels 452 and 440). The smooth wheels 452 are arranged in groups to support four smooth belts 402 on the lower shafts and four smooth belts 402 on the upper shafts. The toothed wheels 440 are arranged in groups to support two toothed belts 450 on the lower shafts and two toothed belts 450 on the upper shafts, with the teeth on the belts 450 engaging the teeth on the wheels 440. Rotation of the shafts 404 and 422 by motors 410 and 424 causes rotation of the remaining shafts through the toothed wheels 440 and belts 450. The rotation of the shafts rotate the smooth wheels 452. Smooth wheels 452 thus drive the smooth belts 402. By using toothed wheels 440 and toothed belts 450, the shafts rotate at exactly the same speed to facilitate driving the sticks 12.

A spring loaded tensioner 442 is associated with each of the upper and lower shafts. Spring loaded tensioners 442 are mounted in slots in the brackets 480 and 482 permitting limited motion toward and away from the belts 402 and 450. A spring in each slot urges the tensioners 442 toward and into contact with the belts 402 and 450 to tension the belts. The tensioners 442 are also capable of rotation about their elongate axis parallel the axis of rotation of the shafts 404-408 and 418-422 and include annular discs 460 that extend between adjacent belts 402 and 450 to maintain the spacing of the belts and cylindrical portions 462 that bear against each belt 402 and 450 to tension the belts. It is desirable to rotatably mount the tensioners 442 in the brackets 480 and 482 so that the tensioners rotate with the belts 402 and 450 to minimize resistance to belt movement while the tensioners tension the belts.

The insertion device 400 is designed such that the portion of each belt 402 traveling between wheels 452 on the upper shafts 406 and 408 is compressed tightly against a similar portion on a belt 402 traveling between wheels 452 on the lower shafts 418 and 420. The motors 410 and 424 rotate in opposite directions such that a stick inserted in the nip 444 formed between the two facing belts 402 will be gripped between the belts and driven forward into the food component 14a-g. The facing belts 402 can grip each stick with a gripping force of about 60 pounds, for example.

As seen in the Figures, a guide bar 490 is preferably mounted between the brackets 480 and 482. The guide bar 490 has a series of holes 492 aligned with the nip 444 between the belts 402 to help guide the sticks 12 into the nips.

Each of the smooth wheels 452 preferably has a groove 496 in the center thereof aligned along the direction the stick 12 is driven. A portion of the smooth belt 402 running on the smooth wheels 452 extends into the groove 496 when the belt 402 is under tension induced by the tensioners 442 that causes a groove to be formed in the side of the belt 402 engaging the stick 12, helping to center and guide the stick in the stick drive direction.

Four sticks 12 can be inserted simultaneously by the insertion device 400, and therefor four air jets are used to initially position the sticks through the holes 492 to the nips 444. As will be understood, the insertion device 400 can be designed to insert as many sticks simultaneously as desired, from one to many, by using a corresponding number of pairs of facing belts 402.

With reference now to FIGS. 31-36, a third modified carrier 500 formed by carrier elements 502 will be described. Each carrier element 502 has extensions 504 and 506 that interact with adjacent carrier elements 502 to form the carriers 500. The extensions 504 extend from a first side 508 of the elements 502 while the extension 506 extends from the opposite side 510 of the elements 502. When fitted next to each other on the chain 18, the extensions 504 of one elements 502 mate with and extend beside the extension 506 on the adjacent element 502 to define a carrier 500, with individual compartments 512a and 512b. The bottoms of compartments 512a and 512b are defined by the mating extensions 504 and 506 and portions of the adjacent carrier element 502. Adjacent compartments 512a and 512b are separated by barrier halves 514 on each side of the elements 502. The barrier halves 514 have notches 530 such that adjacent carrier elements 502 define a V-shaped notch 532 which is aligned along the elongate length of the carrier elements 502 to receive the sticks 12 when the carriers 500 pass the stick inserter. The carriers 500 thus defined by the adjacent elements 502 can be used with the top 58 and any of the presser feet 190, 214 and 240 described previously.

In the design shown in FIGS. 31-36, two extensions 504 and one extension 506 are used on each carrier element 502. With the carrier elements 502 attached to a relatively planar portion of the chain 18, the inner surfaces 516 and 518 of the extensions 504 and 506 of adjacent carrier elements are generally planar as well, defining a flat surface to form the bottom of the compartments 512a and 512b. However, when the chain 18 is bent around a radius as seen in FIG. 34, such as when it travels over the front driving sprocket 66, the adjacent carrier elements 502 are tilted relative each other such that the extensions 504 and 506 tilt upward relative the adjacent carrier element 502 to eject the food components 14 contained therein. This action can either supplement or replace the removal of the food components 14 by the action of cam plates 40 and 42 discussed previously.

The carrier elements 502 are attached to portions 72 and 74 of pins 70 with extensions 54 and 56, as seen in FIGS. 32 and 34. The bottom 520 of each carrier element 502 is generally flat and rests against the top of the link of chain 18 to which it is attached as seen in FIG. 34. Thus, the carrier element 502 remains in the same fixed orientation relative to the link of chain 18 to which it is attached, but, as the chain 18 travels about a radius, such as in passing over sprockets 66 and 68, the adjacent carrier elements 502 tilt relative each other, just as do adjacent links in the chain 18, as clearly seen in FIGS. 34 and 35.

Preferably, a portion of the bottom of each compartment 512a and 512b is made up of extensions 504 and 506, and portions of adjacent carrier elements 502, such as shown in FIG. 31. This assists in ejecting a food component held in the compartment as portions of each compartment bottom will tilt relative other portions to help to break any surface tension, suction or adhesion of the food component 14 to the carrier 500.

With reference now to FIGS. 37-42, a fourth modified carrier 600 formed by carrier elements 602 will be described. Carrier 600 functions in exactly the same manner as carrier 500, but simply has more compartments. Each carrier element 602 has extensions 604 and 606 that interact with adjacent carrier elements 602 to form the carriers 600. The extensions 604 extend from a first side 608 of the elements 602 while the extensions 606 extend from the opposite side 610 of the elements 602. When fitted next to each other on the chain 18, the extensions 604 of one elements 602 mate with and extend between the extensions 606 on the adjacent element 602 to define a carrier 600, with individual compartments 612. The bottoms of compartments 612 are defined by the mating extensions 604 and 606 and other portions of the adjacent elements 602 while adjacent compartments 612 are separated by barrier halves 614 on each side of the elements 602. The barrier halves 614 have notches 630 such that adjacent carrier elements 602 define a V-shaped notch 632 which is aligned along the elongate length of the carrier elements 602 to receive the sticks 12 when the carriers 600 pass the stick inserter. The carriers 600 thus defined by the adjacent elements 602 can be used with the top 58 and any of the presser feet 190, 214 and 240 described previously.

In the design shown in FIGS. 37-42, four extensions 604 and three extensions 606 are used on each carrier element 602. With the carrier elements 602 attached to a relatively planar portion of the chain 18, the inner surfaces 616 and 618 of the extensions 604 and 606 of adjacent carrier elements are generally planar as well, defining a flat surface to form the bottom of the compartments 612. However, when the chain is bent around a radius, such as when it travels over the front driving sprocket 66, the adjacent carrier elements 602 are tilted relative each other such that the extensions 604 and 606 tilt upward relative the adjacent carrier element 602 to eject the food components 14 contained therein. This action can either supplement or replace the removal of the food components 14 by the action of cam plates 40 and 42 discussed previously.

Figure 40:
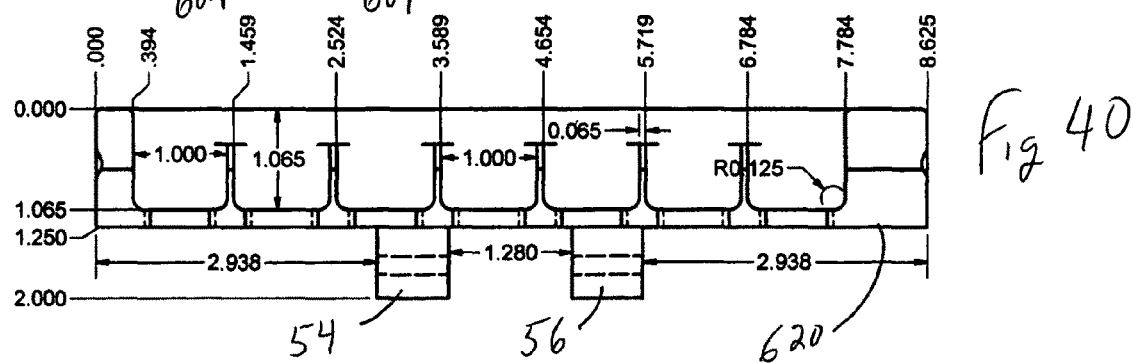
FIG. 40 is a side view of the carrier element of FIG. 37.
Figure 41:
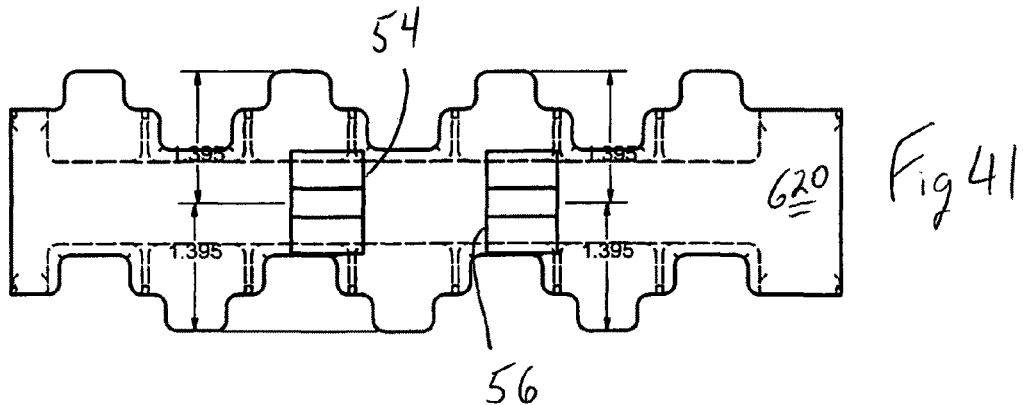
FIG. 41 is a bottom view of the carrier element of FIG. 37.

The carrier elements 602 are attached to portions 72 and 74 of pins 70 with extensions 54 and 56, as seen in FIGS. 38, 40 and 41. The bottom 620 of each carrier element 602 is generally flat and rests against the top of the link of chain 18 to which it is attached. Thus, just as carrier elements 502, the carrier element 602 remains in the same fixed orientation relative to the link of chain 18 to which it is attached, but, as the chain 18 travels about a radius, such as in passing over sprockets 66 and 68, the adjacent carrier elements 602 tilt relative each other, just as do adjacent links in the chain 18.

Preferably, a portion of the bottom of each compartment 612 is made up of both extensions 604 and 606, such as shown in FIG. 42. This assists in ejecting a food component held in the compartment as portions of each compartment bottom will tilt relative other portions to help to break any surface tension, suction or adhesion of the food component 14 to the carrier 600.

As shown, carriers 500 and 600 have three compartments and seven compartments respectively. Carrier 500 defines a center compartment larger than the compartments on either side while carrier 600 defines seven equal size compartments. Clearly, a carrier with any number, size and configuration of compartments can be provided using the appropriately designed carrier elements with at least one extension defining at least part of the bottom of one or more of the compartments.

While the carriers 500 and 600 can be used with sprockets 66 and 68 described above, preferably at least the sprocket 66 is replaced by sprocket which has flat exterior surfaces on its outer rim that correspond to the length of the links of chain 18. The surfaces on the sprocket help support the bottom 520 and 620 of each carrier element 502 and 602 as it passes over the sprocket, helping to insure the tilting of each carrier element 502 and 602 relative the adjacent carrier elements 502 and 602. Two side by side sprockets with flat exterior surfaces can be used to better support each carrier element 502 and 602 near the ends of the elements 502 and 602. For example, a 7½ inch diameter sprocket can be octagon in shape, with eight surfaces about its outer rim.

The carriers 500 and 600 can be used effectively with sticks 12 that do not extend out both ends of the carriers after insertion. When the sticks 12 extend out both ends of the carrier, i.e. are longer than the width of the carrier, the cam plates 40 and 42 can contact each end of the sticks to discharge the kebab. However, when the sticks 12 are shorter than the width of the carrier, the sticks 12 will extend out of only one end of the carriers, making it more difficult for the cam plates 40 and 42 to discharge the kebab. In contrast, the carriers 500 and 600 will effectively discharge the kebab even if the stick 12 is shorter than the width of the carrier and may not extend out one or either end of the carrier. For example, a three inch long stick 12 can be used in a carrier 500 and 600 that is over eight inches wide. Of course, the carriers 500 and 600 work as well to discharge kebabs with sticks that are longer than the width of the carrier.

The carrier elements 502 and 602 can be made of any suitable material, such as Nyoil, Delrin, Teflon or stainless steel.

Although a single embodiment of the invention has been illustrated in the accompanying drawings and described in the foregoing detailed description, it will be understood that the invention is not limited to the embodiment disclosed, but is capable of numerous rearrangements, modifications and substitutions of parts and elements without departing from the spirit and scope of the invention.

I claim:

1. An apparatus for preparing a food item, comprising:
a carrier holding at least one food component in a compartment, the compartment forming part of the carrier, the carrier formed of a first carrier element and a second carrier element, portions of each carrier element forming part of the compartment;
a carrier conveyor assembly, the carrier attached to the carrier conveyor assembly, to convey the carrier from a first position to a second position;
the carrier conveyor assembly tilting the first and second carrier elements relative each other in the second position such that the portions of the carrier elements forming the compartment tilt relative each other to release the food component from the compartment, said carrier elements being identical, each carrier element having at least one first extension on a first side thereof and a plurality of second extensions on a second side thereof, the first extension on the first carrier element extending between the second extensions on the second carrier element to define said carrier, the carrier having a plurality of separate compartments, a partition separating each compartment.

2. The apparatus of claim 1 wherein the carrier elements are snap fit on the carrier conveyor assembly.

3. The apparatus of claim 1 further having a presser foot pressing on the carrier in the first position and a stick insertion device to insert a stick in the food component in the first position.

4. The apparatus of claim 1 further having a camming mechanism to cam the food component from the carrier in the second position.

5. The apparatus of claim 1 wherein each partition has a V-shaped groove therein, the apparatus further comprising a top to fit on the carrier, the top having a plurality of extensions which mate with a portion of the V-shaped grooves in the partitions, said carrier and top defining a continuous cylindrical passage through each partition for passage of a stick.

6. The apparatus of claim 5 wherein each of the carrier elements forms a portion of each compartment and each partition in the carrier.

7. The apparatus of claim 1 wherein the carrier conveyor assembly has at least one sprocket at the second position, said sprocket having a plurality of flat exterior surfaces about an outer periphery thereof, each carrier element having a relatively flat bottom portion contacting a flat exterior surface of said sprocket, said carrier conveyor assembly rotating said sprocket to sequentially tilt each of said carrier elements relative each other.

8. The apparatus of claim 1 wherein said carrier elements are identical, each carrier element having a plurality of first extensions on a first side thereof, the first extensions on the first carrier element extending between the second extensions on the second carrier element to define said carrier.

9. The apparatus of claim 1 wherein the carrier conveyor assembly has a conveyor chain having a plurality of pins, each carrier element having at least one extension engaging one of said pins.

10. The apparatus of claim 1 wherein the compartment defines a bottom, portions of both the first and second carrier elements combining to form the bottom.

11. The apparatus of claim 1 wherein said portions of said first and second carrier elements are formed by extensions, each carrier element having four extensions on a first side thereof and three extensions on a second side thereof.

12. An apparatus for preparing a food item, comprising:
a carrier holding at least one food component in a compartment, the compartment forming part of the carrier, the carrier formed of at least a first carrier element and a second carrier element, said first and second carrier elements forming the compartment, said carrier elements being identical and each carrier element having at least one first extension on a first side thereof and a plurality of second extensions on a second side thereof and a carrier element bottom, the first extension on the first carrier element extending between the second extensions on the second carrier element to define a bottom of said compartment with a portion of the second carrier element, the first and second carrier elements further forming partitions, each partition having a notch therein, the partitions forming walls of the compartment;
a carrier conveyor assembly, the carrier elements being secured to the carrier conveyor assembly, the carrier conveyor assembly conveying the carrier elements from a first position to a second position, the carrier element bottoms of the first and second carrier elements being generally co-planar in the first position with the compartment bottom of said compartment formed by said first extension of said first carrier element and said portion of said second carrier element being a planar surface;
the carrier conveyor assembly tilting the first and second carrier elements relative each other in the second position with the carrier element bottoms of the first and second carrier elements tilted relative each other such that the first extension of said first carrier element and said portion of said second carrier element forming the compartment tilt relative each other to release the food component from the compartment.

13. The apparatus of claim 12 further comprising:
a presser foot pressing on the carrier in the first position;
a stick insertion device to insert a stick in the food component in the first position;
a camming mechanism to cam the food component from the carrier in the second position; and
wherein the carrier conveyor assembly has at least one sprocket at the second position, said sprocket having a plurality of flat exterior surfaces about an outer periphery thereof, the carrier element bottom of each carrier element contacting one of said flat exterior surfaces of said sprocket in the second position, said carrier conveyor assembly rotating said sprocket to sequentially tilt each of said carrier elements relative each other.

14. The apparatus of claim 12 wherein first and second carrier elements have a plurality of barrier halves extending outward from the first and second sides thereof, adjacent barrier halves on the first and second carrier elements defining compartment walls, the apparatus thus defining a plurality of compartments between the first and second carrier elements.

15. The apparatus of claim 14 wherein two barrier halves extend from each of the first and second sides of the first and second carrier elements to define three compartments between the first and second carrier elements.

16. The apparatus of claim 14 wherein six barrier halves extend from each of the first and second sides of the first and second carrier elements to define seven compartments between the first and second carrier elements.

17. The apparatus of claim 12 wherein the carrier conveyor assembly includes a chain having a length, carrier elements being secured along the length of the chain.

18. An apparatus for preparing a food item, comprising:
a carrier holding at least one food component in a compartment, the compartment forming part of the carrier, the carrier formed of at least a first carrier element and a second carrier element, said first and second carrier elements forming the compartment, said carrier elements being identical and each carrier element having at least one first extension on a first side thereof and a plurality of second extensions on a second side thereof and a carrier element bottom, the first extension on the first carrier element extending between the second extensions on the second carrier element to define a bottom of said compartment with a portion of the second carrier element, the first and second carrier elements further forming partitions, each partition having a notch therein, the partitions forming walls of the compartment;
a chain having at least first and second links, said first carrier element being secured to the first link and the second carrier element being secured to the second link, the chain conveying the carrier elements from a first position to a second position, the carrier element bottoms of the first and second carrier elements being generally co-planar in the first position with the compartment bottom of said compartment formed by said first extension of said first carrier element and said portion of said second carrier element being a planar surface;

the chain tilting the first and second carrier elements relative each other in the second position with the carrier element bottoms of the first and second carrier elements tilted relative each other such that the first extension of said first carrier element and said portion of said second carrier element forming the compartment tilt relative each other to release the food component from the compartment.

19. The apparatus of claim 18 wherein said first and second carrier elements have a plurality of barrier halves extending outward from the first and second sides thereof, adjacent barrier halves on the first and second carrier elements defining compartment walls, the second extensions on the second carrier element extending between the first extension on the first carrier element defining bottoms of additional compartments with portions of the first carrier element, the apparatus thus defining a plurality of compartments between the first and second carrier elements.

* * * * *